US011704138B2

(12) United States Patent
Minard et al.

(10) Patent No.: US 11,704,138 B2
(45) Date of Patent: Jul. 18, 2023

(54) METHOD AND SYSTEM FOR CALLING/EXECUTING AN ACTION FROM AN OUTSIDE APPLICATION WITHIN AN EXISTING OPEN APPLICATION

(71) Applicant: DELTA MEDIA GROUP, INC., Canton, OH (US)

(72) Inventors: Michael Minard, North Canton, OH (US); Stephen Brown, North Canton, OH (US)

(73) Assignee: DELTA MEDIA GROUP, INC., Canton, OH (US)

( * ) Notice: Subject to any disclaimer, the term of this patent is extended or adjusted under 35 U.S.C. 154(b) by 0 days.

(21) Appl. No.: 17/215,620

(22) Filed: Mar. 29, 2021

(65) Prior Publication Data
US 2021/0349740 A1 Nov. 11, 2021

Related U.S. Application Data

(60) Provisional application No. 63/022,703, filed on May 11, 2020.

(51) Int. Cl.
*G06F 3/0484* (2022.01)
*G06F 9/451* (2018.01)
(Continued)

(52) U.S. Cl.
CPC .......... *G06F 9/451* (2018.02); *G06F 3/04842* (2013.01); *G06F 9/542* (2013.01); *G06F 9/547* (2013.01)

(58) Field of Classification Search
CPC .......... G06F 9/451; G06F 9/542; G06F 9/547; G06F 3/04842
See application file for complete search history.

(56) References Cited

U.S. PATENT DOCUMENTS

| 5,581,686 | A | * | 12/1996 | Koppolu | ................ G06F 9/543 |
| | | | | | 715/802 |
| 6,523,022 | B1 | * | 2/2003 | Hobbs | .................. G06F 16/332 |
| | | | | | 707/999.005 |

(Continued)

FOREIGN PATENT DOCUMENTS

| JP | 2017-062782 A | 3/2017 |
| KR | 10-2014-0145894 A | 12/2014 |

OTHER PUBLICATIONS

Applicant, as of the date of this submission, is not aware of any prior art devices or documents which are believed material to the invention as claimed. This document is being supplied for informational purposes to the Examiner as of the submission date in accordance with the duty of disclosure. Supplemental statements will be provided as necessary.

(Continued)

*Primary Examiner* — Phenuel S Salomon
(74) *Attorney, Agent, or Firm* — Emerson Thomson Bennett; Daniel A. Thomson

(57) ABSTRACT

Systems and methods for executing a second application within a primary application window are provided, thereby improving the usability of graphical user interfaces (GUI). An exemplary method comprises executing a first application on the primary application window. The primary application window displays a plurality of GUI elements associated with the first application. The first application is configured to execute a second application upon processing an event invoked on the primary application window. Thereafter, the first application and the primary application window are suspended and a secondary application window is displayed within the primary application window. The second application window displays a plurality of GUI elements associated with the secondary application. The first (Continued)

application and primary application window automatically resume after closing the secondary application window.

18 Claims, 16 Drawing Sheets

(51) Int. Cl.
*G06F 3/04842* (2022.01)
*G06F 9/54* (2006.01)

(56) References Cited

U.S. PATENT DOCUMENTS

| | | | | |
|---|---|---|---|---|
| 8,365,144 | B1* | 1/2013 | Webb | G06F 8/38 |
| | | | | 717/109 |
| 8,527,943 | B1* | 9/2013 | Chiluvuri | G06F 8/36 |
| | | | | 717/107 |
| 2004/0001092 | A1* | 1/2004 | Rothwein | G06F 8/38 |
| | | | | 715/763 |
| 2005/0149914 | A1* | 7/2005 | Krapf | G06F 9/4488 |
| | | | | 717/136 |
| 2009/0160785 | A1* | 6/2009 | Chen | G06F 3/04883 |
| | | | | 345/173 |
| 2009/0177985 | A1* | 7/2009 | Mueller | G06Q 10/06 |
| | | | | 715/763 |
| 2010/0077344 | A1* | 3/2010 | Gaffney | G06F 3/0481 |
| | | | | 715/788 |
| 2011/0223945 | A1 | 9/2011 | Bhatnagar | |
| 2014/0380139 | A1* | 12/2014 | Mondri | G06Q 10/063 |
| | | | | 715/212 |
| 2017/0185460 | A1* | 6/2017 | Feller | G06F 9/541 |
| 2017/0185612 | A1* | 6/2017 | Kamadolli | H04L 67/02 |
| 2018/0013579 | A1* | 1/2018 | Fairweather | H04L 67/125 |
| 2018/0342910 | A1* | 11/2018 | Bergsrud | H02J 50/70 |
| 2020/0257920 | A1* | 8/2020 | Kumar | G06V 10/443 |

OTHER PUBLICATIONS

International Search Report dated Aug. 27, 2021 for International Application Serial No. PCT/US2021/031515.
English language translation of Korean Patent Application 1020140145894.
English language translation of Japanese Patent Application 2017062782.

* cited by examiner

METHOD AND SYSTEM FOR CALLING/EXECUTING AN ACTION FROM AN OUTSIDE APPLICATION WITHIN AN EXISTING OPEN APPLICATION

CROSS-REFERENCE TO RELATED APPLICATION

This application claims the benefit of U.S. Provisional Patent Application Ser. No. 63/022,703, filed May 11, 2020, and entitled "Method and System for Calling/Executing an Action From an Outside Application Within An Existing Open Application," which is incorporated by reference herein in its entirety, including any figures, tables, equations, or drawings.

TECHNICAL FIELD

The systems and methods disclosed herein generally relate to software improvements. More particularly, the systems and methods improve the usability of graphical user interfaces (GUI) by providing for the execution of another application within the window of a primary application and automatically returning to the primary application upon completion.

BACKGROUND

Since the innovation of computers and computer user interfaces, a primary struggle for technology adoption has been interface design and operator training. As we have entered the modern computing era computers and computer software design has permeated all aspects of our lives, yet application interface design continues to lag necessitating extensive training and user guides. Today application users are required to navigate, or be taken to, the appropriate section of an application to perform certain actions.

The principles disclosed herein removes this requirement and empowers application builders to provide unlimited functionality to take action for any action from any page or section of an application, including the ability to take action from within one application to another application without leaving the current application.

The principles disclosed herein pertain to the art of a method for calling and executing an action from an outside application from within an existing open application to perform an action, thereby streamlining the user experience while performing a task. The method comprises of: (a) a running application; (b) a plurality of external actions that can be invoked; (c) an application method and state that can call external actions; and (d) means for calling and executing these external actions without leaving the running application state.

In current applications, such as a customer relationship management (CRM), in order to add a new customer users are required to either navigate to the appropriate section of the application or search for the action wanting to be taken, such as adding a new customer. Thereafter, the user is either taken or navigates to that section where they are able to add a new customer.

The principles disclosed herein, with recent advances in computer technology, provides the ability for a computer operator to add a new customer within a CRM from anywhere within the application without leaving the current area of the application. For example, a computer operator using a CRM could be in the reporting area of the CRM application and type 'add new customer' in a search box and have the ability to add a new customer without ever leaving the reporting area of the CRM.

Therefore, the principles disclosed herein can massively streamline computer operator workflow, massively negate the need for application training, and fundamentally change what is possible today with computer application interfaces. The principles disclosed herein are applicable across various industries and devices. For example, automotive screens and voice interfaces, mobile phone platforms, computer based applications, and other computing devices.

SUMMARY

Systems and methods for executing a second application within a primary application window are provided, thereby improving the usability of GUIs. An exemplary method comprises executing a first application on the primary application window. The primary application window displays a plurality of GUI elements associated with the first application. The first application is configured to execute a second application upon processing an event invoked on the primary application window. Thereafter, the first application and the primary application window are suspended and a secondary application window is displayed within the primary application window. The second application window displays a plurality of GUI elements associated with the secondary application. The first application and primary application window automatically resume after closing the secondary application window.

In accordance with one aspect of the principles disclosed herein, an input mechanism (text search input, buttons, links, voice application programming interface (API), web API) that searches for matching events is disclosed. The input mechanism may also search multiple types of fields simultaneously such as customers, items, etc. in addition to matching events. Matching Events may include pre-defined phrases, user modifiable phrases, and A.I. augmented phrases based on user activity.

In accordance with another aspect of the principles disclosed herein, in the case of a Text Search Input or Voice API call or Web API call, a listening mechanism is disclosed to identify Matching Events. When the listening mechanism identifies a matching Quick Action the Quick Action link is returned to be passed via an App Method off an identifiable tag, class, or attribute of an element.

In accordance with still another aspect of the principles disclosed herein, an application method based off an identifiable tag, class, or attribute of an element permits the ability to open a window within the current running application. The application method will also pass a callback function to the application method making it possible to maintain the original running application state at the end of the Quick Action.

In accordance with still another aspect of the principles disclosed herein, a scripting application running within the running application, such as JavaScript, provides the ability for an application method to be called and run within the running application. The principles disclosed herein also provides the ability for the application method to be called and run within the scripting application.

In accordance with still another aspect of the principles disclosed herein, the principles disclosed herein provides a support for executing actions within a modal or window of the running application such a showing a form, adding events to the form, and adding event specific buttons or actions.

One or more aspects of the principles disclosed herein provides user interaction and input within the modal or window of the running application for the Quick Action.

Other aspects of the principles disclosed herein provide support for registered events to be performed by the user to the called Quick Action and once performed to call the application specific methods and to pass the original callback function back to the scripting application residing within the running application.

Other benefits and advantages will become apparent to those skilled in the art to which it pertains upon reading and understanding of the following detailed specification.

BRIEF DESCRIPTION OF THE DRAWINGS

The detailed description makes reference to the accompanying figures wherein.

The figures are only intended to facilitate the description of the principles disclosed herein. The figures do not illustrate every aspect of the principles disclosed herein and do not limit the scope of the principles disclosed herein. Other objects, features, and characteristics will become more apparent upon consideration of the following detailed description.

DETAILED DESCRIPTION

A detailed illustration is disclosed herein. However, techniques, methods, processes, systems and operating structures in accordance with the principles disclosed herein may be embodied in a wide variety of forms and modes, some of which may be quite different from those disclosed herein. Consequently, the specific structural and functional details disclosed herein are merely representative.

The flowcharts and block diagrams described in the figures below illustrate the architecture, functionality, and operation of possible implementations of systems, methods, and computer program products according to various embodiments of the principles disclosed herein. In this regard, each block in the flowcharts or block diagrams may represent a module, segment, or portion of code, which comprises one or more executable instructions for implementing the specified local function(s). In some alternative implementations, the functions noted in a block may occur out of the order noted in the figures. For example, two blocks shown in succession may, in fact, be executed substantially concurrently, or the blocks may sometimes be executed in the reverse order, depending upon the functionality involved. Furthermore, each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
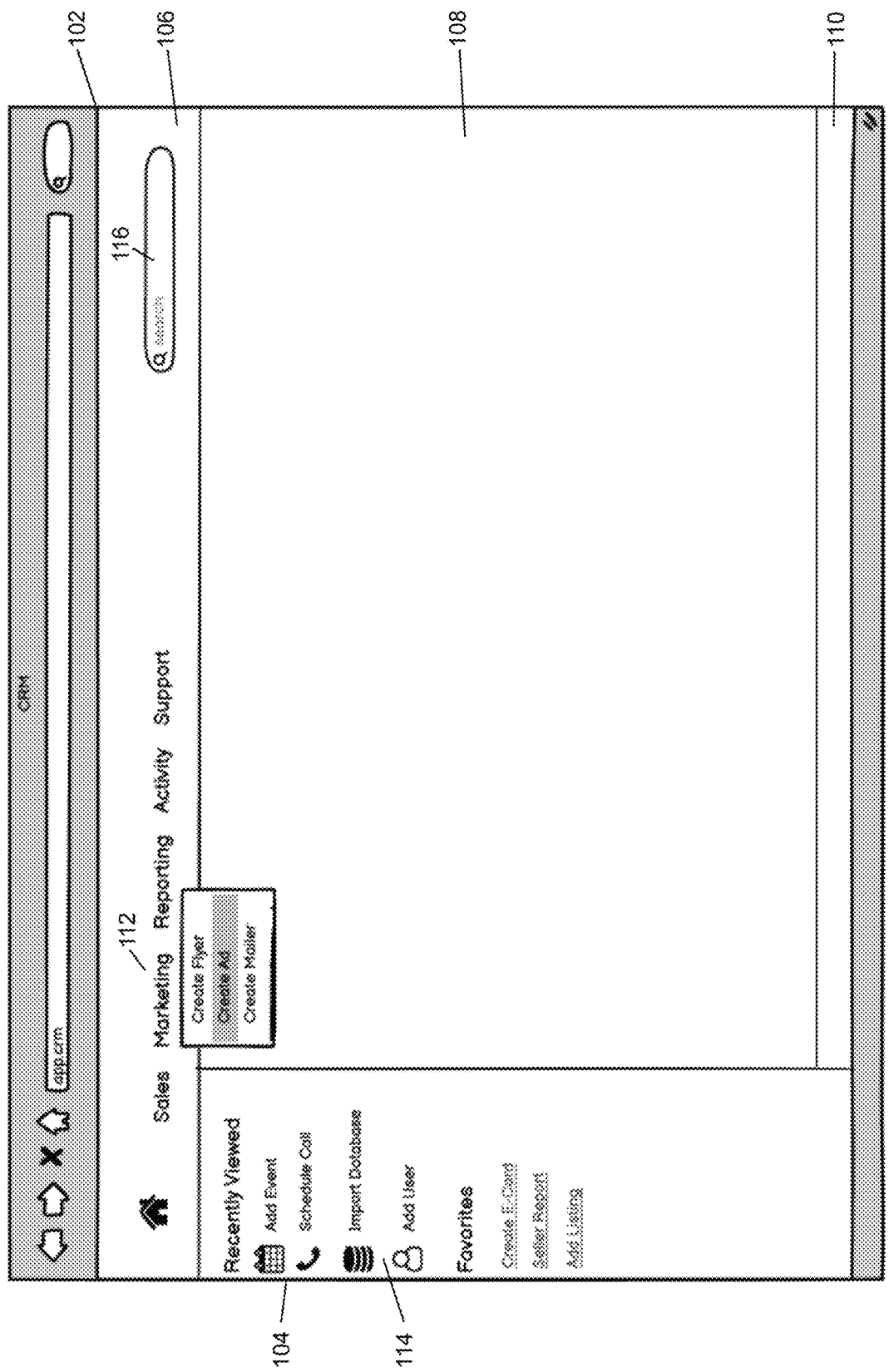
FIG. 1 illustrates an exemplary prior art GUI.

FIG. 1 illustrates a problem associated with current GUI systems where a user of an exemplary customer relationship management (CRM) web application is required to navigate to various separate application windows to perform actions. Exemplary CRMs include, but are not limited to, ZOHO CRM, SUGAR CRM, SALESFORCE, HUBSPOT, and MICROSOFT DYNAMICS 365.

Window 102 is displayed on a user terminal executing a web application. The user terminal communicates over a network with a server. As shown in FIG. 1, window 102 comprises various GUI elements, including sidebar area 104, top header area 106, main area 108, and footer area 110. Due to the complexity of CRM web applications, various usability problems persist with known computer implemented systems and methods. For example, a user is required to learn the specifics associated with the user interface of the CRM web application before efficiently utilizing the various functions and accessing information.

In this example, top header area 106 comprises top navigation menu 112 comprises a plurality of uniform resource location (URL) links configured to navigate users to the various functions and information of the web application. As shown, top navigation menu 112 comprises a tab-based menu system that requires a user to navigate through various tabs to access the plurality of URL links. Also, sidebar area 104 comprises side navigation menu 114, which comprises a plurality of additional URL links to access the functions and information of the web application. As a result, the learning curve for navigating the functions and information of the web application can be steep and require excessing time and resource demand of the user. Such difficulties can further exasperate the adoption of technology within organizations that some businesses are facing. Organizations today are measuring the adoption rate of the technology they deploy and generally seek training solutions to low adoption rates. Because of these low adoption rates, user productivity suffers, company reporting is incomplete, and users struggle to be successful at their position.

Such inherent disadvantages in know systems have not been entirely ignored. As shown in FIG. 1, window 102 comprises search bar 116. Search bar 116 is configured to search the web application for URL links to the various functions and information of the web application. However, as discussed in further detail below, the search can require a user to visit various applications when searching for a function, thereby needlessly expending time and system resources.

Yet another issue with known methods of navigating web application is the use of system resources. In this example, each URL link is configured to generate a Hypertext Transfer Protocol (HTTP) GET request to a server and download Hypertext Markup Language (HTML), images, Cascading Style Sheets (CSS), and JavaScript code onto the local memory of the user terminal. As a result, the user terminal is required to cache or re-download portions of the web application as the user inefficiently navigates from application to application. This can adversely affect the performance of the web application on user terminals due to limited system resources, and can negatively impact the productivity of the user. Providing a solution to these usability problem has tremendous positive financial implications to various businesses and users of software technology.

Figure 2:
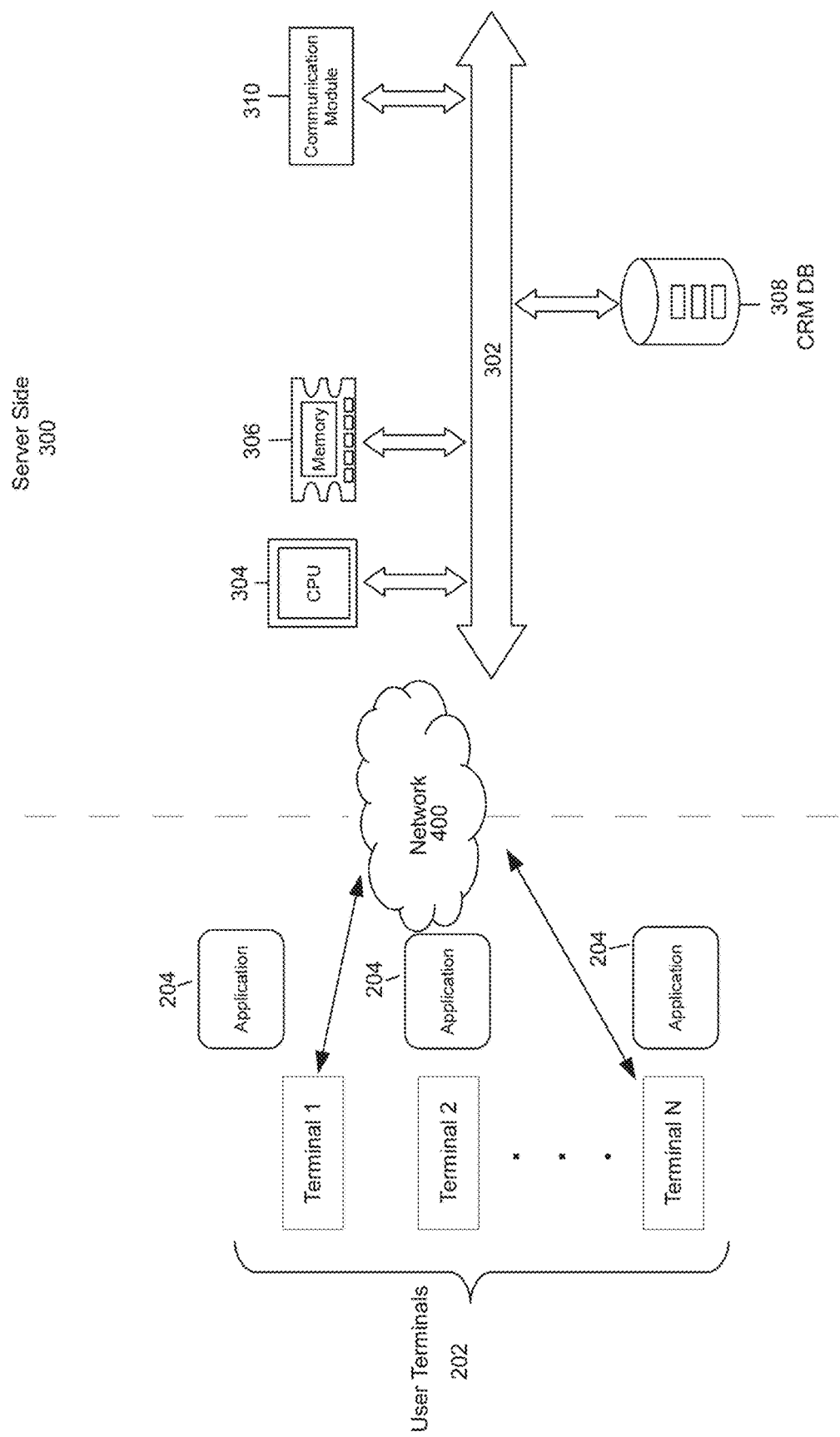
FIG. 2 illustrates an exemplary block diagram of a computer system in accordance with the principles disclosed herein.

Referring to FIG. 2, shown is an exemplary block diagram of a computer system for an exemplary CRM web application in accordance with the principles disclosed herein. Server side 300 can be implemented on hardware or a combination of hardware and software. In this example, the techniques disclosed herein are implemented in a software environment such as an operating system or in an application running on an operation system. This software can include, but is not limited to resident software, firmware, etc. or is implemented on a cloud-based or virtualized network system. Server side 300 comprises at least one computer processing unit (CPU) 304 and at least one memory 306 are interconnected to bus 302. Communication Module 310 is configured to allow server side 300 to communicate through network 400 with user terminals 202. Further, the computer system architecture comprises CRM database 308. CRM database 308 is configured to store CRM data including, but not limited to, sales, user, and marketing information. CRM database 308 can store data over one or multiple databases.

One of ordinary skill in the art will readily recognize that the system architecture of server side 300 is a simplified view and can include additional elements that are not depicted without departing from the principles disclosed herein. For example, although a single stand-alone server side 300 is depicted, a plurality of servers (or server-like devices) can be connected to one or more data storage systems. Furthermore, the server side 300 can be local, remote, or a combination thereof. In this example, server side 300 is configured to communicate over network 400.

User terminals 202 communicate over network 400 with server side 300. Exemplary user terminals include, but are not limited to, a mobile telephone, cellular telephone, smart telephone, laptop computer, netbook, personal digital assistant (PDA), or any other computing device with a display and suitable for network communication. In this example, user terminals 202 comprises a web browser application that supports executing JavaScript code, Asynchronous JavaScript and XML(AJAX), HTML, and CSS. Application 204 comprises computer executable instructions and is stored in memory located on user terminal 202. As described in detail below, Application 204 is configured to execute quick actions that can receive, process, store, and transmit information between user terminal 202 and server side 300.

Network 400 can be a local area network (LAN), a wide area network (WAN), the Internet, cellular networks, satellite networks or any other network that permits the transfer and/or reception of data to and/or from server side 300. The data transmitted to or from server side 300 through network 400 can be transmitted and/or received utilizing standard telecommunications protocol or standard networking protocol. In the example shown in FIG. 2, the system utilizes Transmission Control Protocol/Internet Protocol (TCP/IP) and network 400 is the Internet. Other examples of protocols for transmitting and/or receiving data include, but are not limited to, Voice Over IP (VOIP) protocol, Short Message Service (SMS), and Global System for Mobile Communications (GSM). Network 400 is capable of utilizing one or more protocols of application 204 and server side 300. Furthermore network 400 can translate to or from other protocols to one or more protocols of user terminals 202. As a result, a user can seamlessly transition from one device to another and continue utilizing a CRM web application in accordance with the principles disclosed herein.

Figure 3:
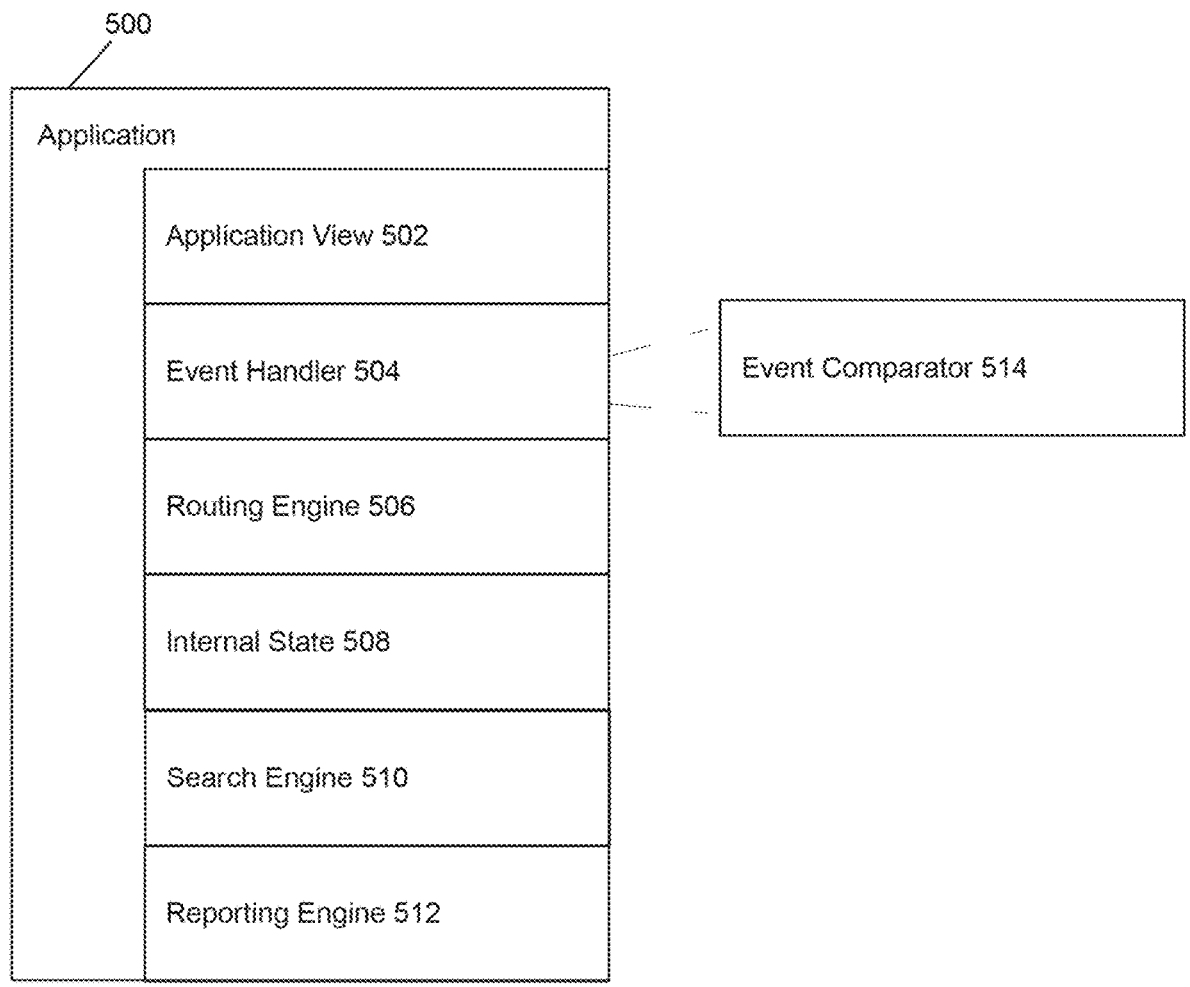
FIG. 3 illustrates a block diagram of exemplary components for an application in accordance with the principles disclosed herein.

FIG. 3 depicts a block diagram of exemplary components for a CRM application executing on a user terminal in accordance with the principles disclosed herein. Application 500 comprises application view 502, event handler 504, routing engine 506, internal state 508, search engine 510, and reporting engine 512. Application view 502 is configured to display various GUI elements, including input mechanism. Exemplary input mechanisms include, but are not limited to, a search input, buttons, URL links, and voice or speech input. Search engine 510 is configured to receive an input from a user terminal. Event comparator 514 is configured to identify a corresponding matching event based on a comparison of the input and predefined events. Thereafter, search engine 510 returns a list of URL links corresponding to relevant quick actions and/or standard URL links. In this example, a quick action is selected based on an identifiable tag, class, or attribute that is related to the input. For example, the event comparator can be configured to return the identifiable tag, class, or attribute definition of addCustomer for inputs related to "add a new customer," "new customer," "new," and/or "add." It would be apparent to one of ordinary skill in the art to use a variety of other terms or phrases for mapping the addCustomer identifiable tag, class, or attribute definition to a user input without departing from the principles disclosed herein.

Routing engine 506 is configured to receive information and determine the application 500 and application view 502 of the CRM application to display on a user terminal (shown in FIG. 2). Internal state 508 comprises global variables and the application state. Event handler 504 is configured to handle events that occur on the user interface of application view 502.

Figure 4A:
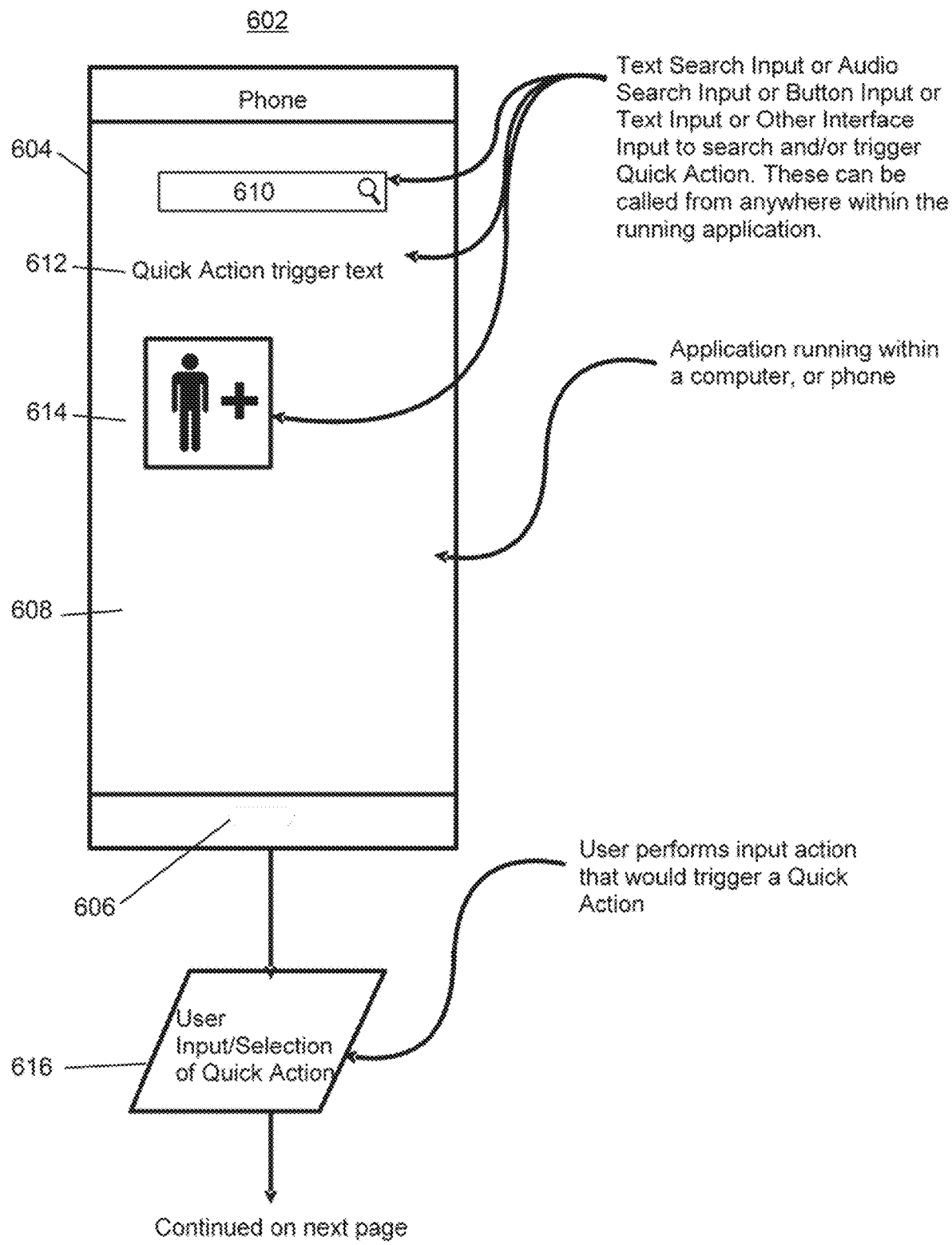
FIG. 4A illustrates a flowchart depicting an exemplary process in accordance with the principles disclosed herein.
Figure 4B:
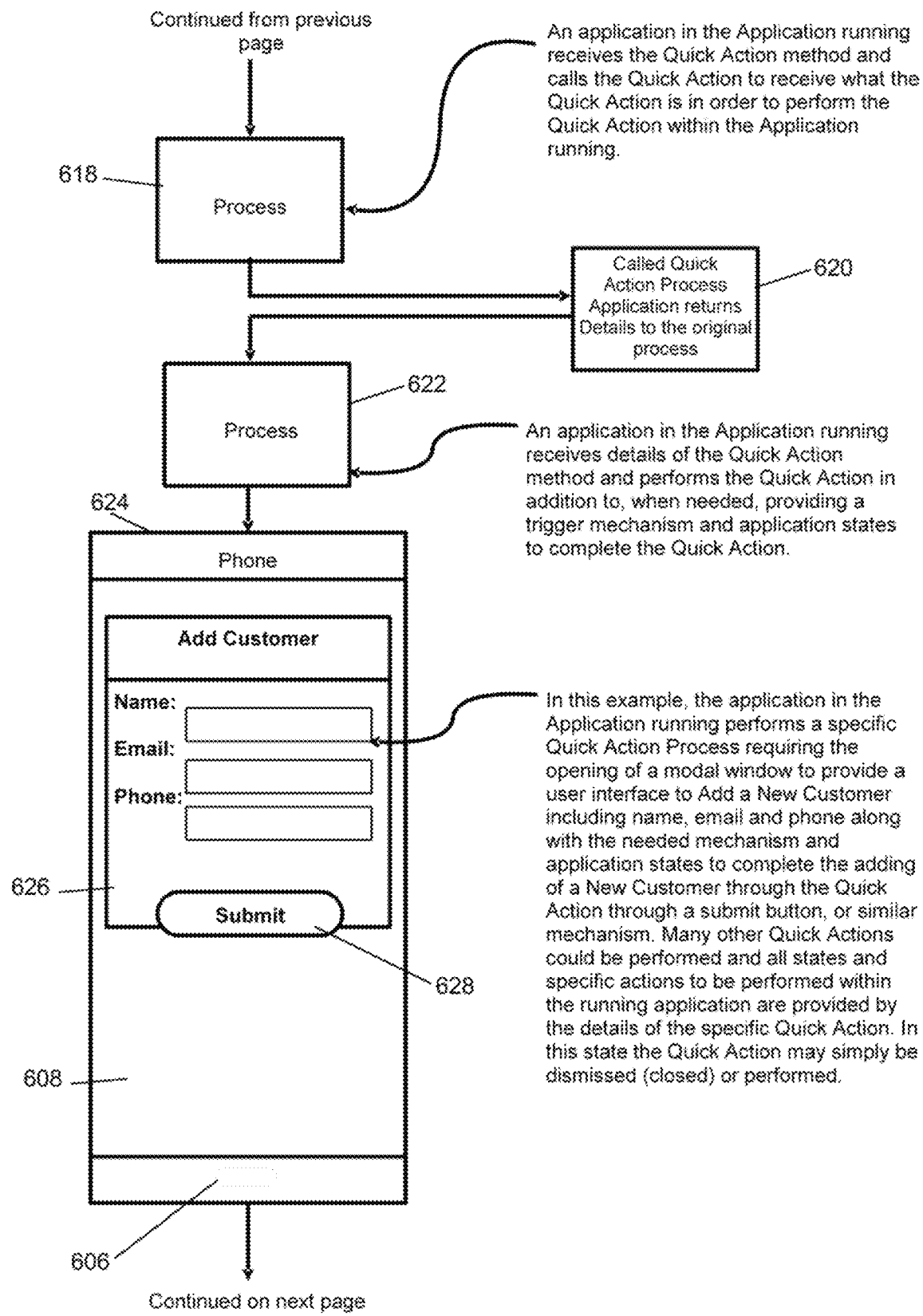
FIG. 4B illustrates a flowchart depicting an exemplary process in accordance with the principles disclosed herein.
Figure 4C:
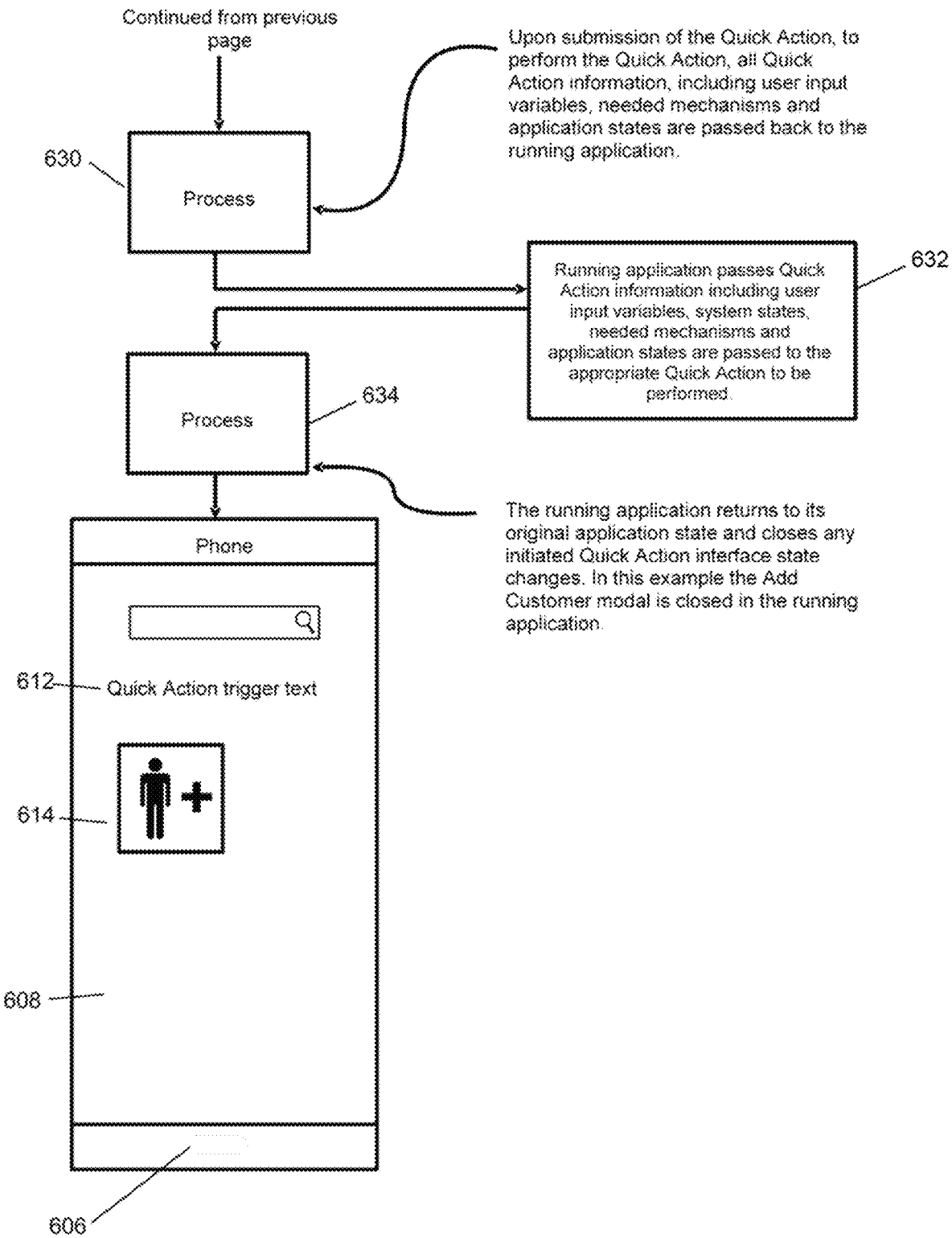
FIG. 4C illustrates a flowchart depicting an exemplary process in accordance with the principles disclosed herein.

Turning next to FIGS. 4A-4C, shown is an exemplary process of utilizing quick actions to improve the usability of GUIs in accordance with the principles disclosed herein. As shown in FIG. 4A, user terminal 602 is a smart phone and comprises display 604 and microphone 606. Shown on display 604 is a web browser application executing an exemplary CRM application comprising JavaScript code, AJAX, HTML, and CSS. Code excerpt 1 illustrates an exemplary code fragment for implementing quick actions that are executed on user terminal 602. A code fragment is an incomplete set of instructions in a specific software language, such as Javascript code, AJAX, HTML, CSS, C#, and/or C++, and may contain a routine and/or sub-routine.

```
Code excerpt 1:
var app = {
    options: {
        ajaxParams: { action:'app' },
    },
    searchCustomers: function(options, funcCallback, objCallback) { . . . },
    addCustomer: function(options, funcCallback, objCallback) {. . .}
};
/** Setup click handlers on any anchor tag that has a class of selectCustomer */
$('body').on('click','a.selectCustomer', function(event){ . . .});
$('body').on('click','a.addCustomer', function(event){ . . . });
$('body').on('click','div[data-method="selectCustomer"]', function(event){ . . .});
$('body').on('click','span#addCustomer', function(event){ . . . });
```

As shown in Code excerpt 1, quick actions utilizing callback functions are defined for searching and adding customers. The app variable corresponds to the main class of the CRM application and defines global functions and global variables that are accessible by any application of the CRM application. Therefore, the quick actions for searchCustomers and addCustomers are configured to be called from any application of the CRM application. The arguments passed to the searchCustomers method includes options, a callback function, and a callback object. The arguments passed to the addCustomer method includes options, a callback function, and a callback object. Code excerpt 1 also includes configurations for click handlers for an identifiable tag, class, or attribute. These click handlers are configured to call the global methods searchCustomers and addCustomer, respectively. The click handlers are defined outside of the app variable, and therefore only accessible to the specific application of the CRM application that they are defined.

Primary application window 608 depicts the current application of the CRM web application that the user is interacting with. In this example, primary application window 608 comprises a plurality of GUI elements, including search bar 610, URL link 612, and URL link 614. As shown, URL link 612 comprises selectable text while URL link 614 comprises a selectable icon. Further, URL link 612 and URL link 614 comprise of an identifiable tag, class, or attribute definition for addCustomer. As a result, URL link 612 and URL link 614 are configured to call a quick action to add a customer in accordance with the principles disclosed herein.

In addition, search bar 610 is configured to allow a user to search for and select a quick action in accordance with the principles disclosed herein. The user can enter a text input into search bar 610. Furthermore, user terminal 602 is configured to receive voice or speech input through microphone 606. A speech-to-text service or processor is configured to generate a textual interpretation of the voice or speech input which is entered into search bar 610. As discussed above with reference to FIG. 3, the search engine of the CRM application compares the input and returns a list of user selectable quick actions and/or standard URLs to access the applications of the CRM application. In this example, a result for "add customer" includes an identifiable tag, class, or attribute for addCustomer. It would be apparent to one of ordinary skill in the art that the text input, audio search input, button input, or text input can be selected from anywhere within primary application window 608 and/or the CRM application, without departing from the principles disclosed herein.

In step 616, the user selects a quick action to add a customer. As a result, this triggers an onClick event that the event handler of the CRM application processes in step 618 (shown in FIG. 4B). In this example, the event handler determines the quick action to process by comparing the identifiable tag, class, or attribute definition of the element that triggered the onClick event to predefined quick actions. Code excerpt 2 illustrates an exemplary code fragment for processing an onClick event to add a customer.

```
Code excerpt 2:
$('body').on('click','a.addCustomer', function(event){
    event.preventDefault( ); // Prevent browser from running href.
    event.stopImmediatePropagation( ); // Stop rest of the events from running.
    var $that = $(this);
    app.addCustomer(
        { }, // options
        function(data) { // callback function
            var linkhref = $that.attr('href'); // get initial links href
            linkhref = linkhref+'&'+$.param(data); // add the results from the call back function to
the initial link
            location.href = linkhref; // go to link with the new data appended.
        }
    );
});
$('body').on('click','span#addCustomer', function(event){
    event.preventDefault( ); // Prevent browser from running href.
    event.stopImmediatePropagation( ); // Stop rest of the events from running.
    var $that = $(this);
    app.addCustomer(
        { }, // options
        function(data) { // callback function
            var linkhref = $that.attr('href'); // get initial links href
```

```
            linkhref = linkhref+'&'+$.param(data); // add the results from the call back function to
the initial link
            location.href = linkhref; // go to link with the new data appended.
        }
    );
});
```

As shown in Code excerpt 2, the event handler suspends the internal state of the application currently executing on primary application window 608. In this example, the browser is prevented from changing the current application by disabling the Hypertext Reference (HREF) command and stopping all other events of the current application from executing. The plurality of GUI elements of the application currently executing on primary application window 608 are configured to remain rendered on primary application window 608, while its internal state is suspended. Further, any HTML, images, CSS, and JavaScript code associated with the application currently executing on primary application window 608 remain stored on the system Random Access Memory (RAM). As a result, the user can interact with the quick action and will automatically return to the current state of the application currently executing on primary application window 608 after exiting or canceling the quick action. Further, the event handler stores a reference to the element that was clicked on, thereby allowing the quick action to access the values of the element that was clicked on. In Code excerpt 2 a reference to the application currently suspended on primary application window 608 is stored. As a result, the functions (including quick actions) and variables defined in Code excerpt 1 can be accessed within a quick action. In step 620, the quick action is processed utilizing a callback function. Code excerpt 3 illustrates an exemplary code fragment for processing a quick action to add a customer.

for adding a customer within secondary application window 626. Secondary application window 626 is configured to be rendered within the bounds of primary application window 608. In this example, secondary application window 626 is not an independent window and its contents are displayed within primary application window 608. Further, the various GUI elements of secondary application window 626 overlap the plurality of GUI elements of primary application window 608 that are positioned within the bounds of secondary application window 626. As a result, the responsiveness of user terminal 602 can be improved, because user terminal 602 is not required to unload the various GUI elements shown in primary application window 608 prior to displaying the GUI elements of secondary application window 626. Further, by maintaining the GUI elements of primary application window 608, user terminal 602 can quickly display primary application window 608 upon exiting of the quick action. It would be apparent to one of ordinary skill in the art to display secondary application window in its own independent window, for example a pop-up window, without departing from the principles disclosed herein.

Secondary application window 626 is a child to primary application window 608 and displayed within application window 608. A user is prevented from interacting with primary application window 608 while secondary application window 626 is open. In step 620, the details of the quick action are returned to the original process that called the

```
Code excerpt 3:
addCustomer: function(options, funcCallback, objCallback) {
    var params = $.extend({ }, app.options.ajaxParams, options.ajaxParams);
    params.action = arguments.callee.name; // 'addCustomer'
    /** get html form */
    $.get('index.php',function(data) {
        /** Load contents into a modal. */
        modal.html(data).show( );
        /** find a button with search customer class on it and if so add a click event to it. */
        modal.find('.btn-searchCustomers').on('click', function(e){
            /** stop the form from submitting natively */
            e.preventDefault( );
            e.stopImmediatePropagation( );
            /** run new method with original call back. */
            app.searchCustomers({ajaxParams:ajaxParams},funcCallback,objCallback);
        });
        /** setup events for the add customer form */
        modal.find('form').on('submit',function(e){
            /** stop the form from submitting natively */
            e.preventDefault( );
            e. stopImmediatePropagation( );
            /** Make ajax call here with form information */
            $.post('index.php',form.params,function(data){
                /** Ajax results will return the data back to the original call back function */
                funcCallback(data);
            });
        });
    });
}
```

As shown in Code excerpt 3, the quick action for adding a customer comprises a callback function. In this example, the quick action is configured to load various GUI elements quick action. Thereafter, the original process renders application window 626 within primary application window 608. As shown in step 624, secondary application window 626 comprises fields to enter the name, email address, and phone number of the new customer. Further, secondary application window 626 comprises submit button 628.

Turning next to FIG. 4C, in step 630, the user presses the submit button. Thereafter, the event handler of the CRM application processes the quick action event for adding a customer in step 632. As shown in Code excerpt 3, first the default action of a submit button for submitting a form is disabled. Thereafter, a form post is executed whereby the quick action information including variables and data are configured to return the data back to the original call back function. Finally, in step 634, secondary application window 626 is closed and primary application window 608 returns to its application state prior to the initiation of the quick action.

In certain examples, this process can include clearing any events queued in the event handler. Also, the primary application window can notify the user whether the addition of the new user was successful or use the data for other functions. For example, if the application in the primary window was creating a new property listing, the data returned from the quick action to create a new customer can be used to populate the ownership and contact information of the new property listing.

The second application can also execute a third application. Code excerpt 3 comprises an event handler for a callback function in secondary application window 626 to search for customers.

```
/** find a button with search customer class on it and if so add a click event to it. */
modal.find('.btn-searchCustomers').on('click', function(e){
    /** stop the form from submitting natively */
    e.preventDefault( );
    e.stopImmediatePropagation( );
    /** run new method with original call back. */
    app.searchCustomers({ajaxParams:ajaxParams},funcCallback,objCallback);
});
```

Prior to executing the callback function to search for customers, the events on secondary application window 626 are suspended by the event handler. The plurality of GUI elements of the application currently executing on secondary application window 626 are configured to remain rendered on secondary application window 626, while its internal state is suspended. Further, any HTML, images, CSS) and JavaScript code associated with the application currently executing on secondary application window 626 remain stored on the system RAM. Therefore, secondary application window 626 can return to its original state after completing executing the search for customer application. This greatly improves the usability of the CRM application by allowing the user to confirm the existence of a customer record without exiting the quick action to add a new customer. In this example, the quick action to search for customers is called by the original call back invoked by primary application window 626. As shown in Code excerpt 1, the callback function searchCustomers is defined as a global function. Therefore, the callback function searchCustomers can be called from anywhere in the CRM application. Code excerpt 4 illustrates an exemplary code fragment for processing a quick action search for a customer.

```
Code excerpt 4:
searchCustomers: function(options, funcCallback, objCallback) {
    var params = $.extend({ }, app.options.ajaxParams, options.ajaxParams);
    params.action = arguments.callee.name; // 'searchCustomers'
    /** get html form */
    $.get('index.php',function(data) {
        /** Load contents into a modal. */
        modal.html(data).show( );
        /** find a button with add customer class on it and if so add a click event to it. */
        modal.find('.btn-addCustomer').on('click', function(e){
            /** stop the form from submitting natively */
            e.preventDefault( );
            e.stopImmediatePropagation( );
            /** run new method with original call back. */
            app.addCustomer({ajaxParams:ajaxParams},funcCallback,objCallback);
        });
        /** load up customer autocompleter */
        $('input.searchCustomers').autocompleter({
            onSelect: function(data) {
                /** when selecting someone return the data selected back to original call back
function */
```

-continued

```
            funcCallback(data);
        }
    });
});
},
/** Setup click handlers on any anchor tag that has a class of selectCustomer */
$('body').on('click','a.selectCustomer', function(event){
    event.preventDefault( ); // Prevent browser from running href.
    event.stopImmediatePropagation( ); // Stop rest of the events from running.
    var $that = $(this);
    app.searchCustomer(
        { }, // options
        function(data) { // callback function
            var linkhref = $that.attr('href'); // get initial links href
            linkhref = linkhref+'&'+$.param(data); // add the results from the call back function to the initial link
            location.href = linkhref; // go to link with the new data appended.
        }
    );
});
```

As shown in Code excerpt 4, the quick action for searching for a customer comprises a callback function. In this example, the quick action is configured to load various GUI elements for searching a customer within a secondary application window. The process of searching for a customer is similar to the steps described above for adding a new customer utilizing quick actions in accordance with the principles disclosed herein.

Figure 5A:
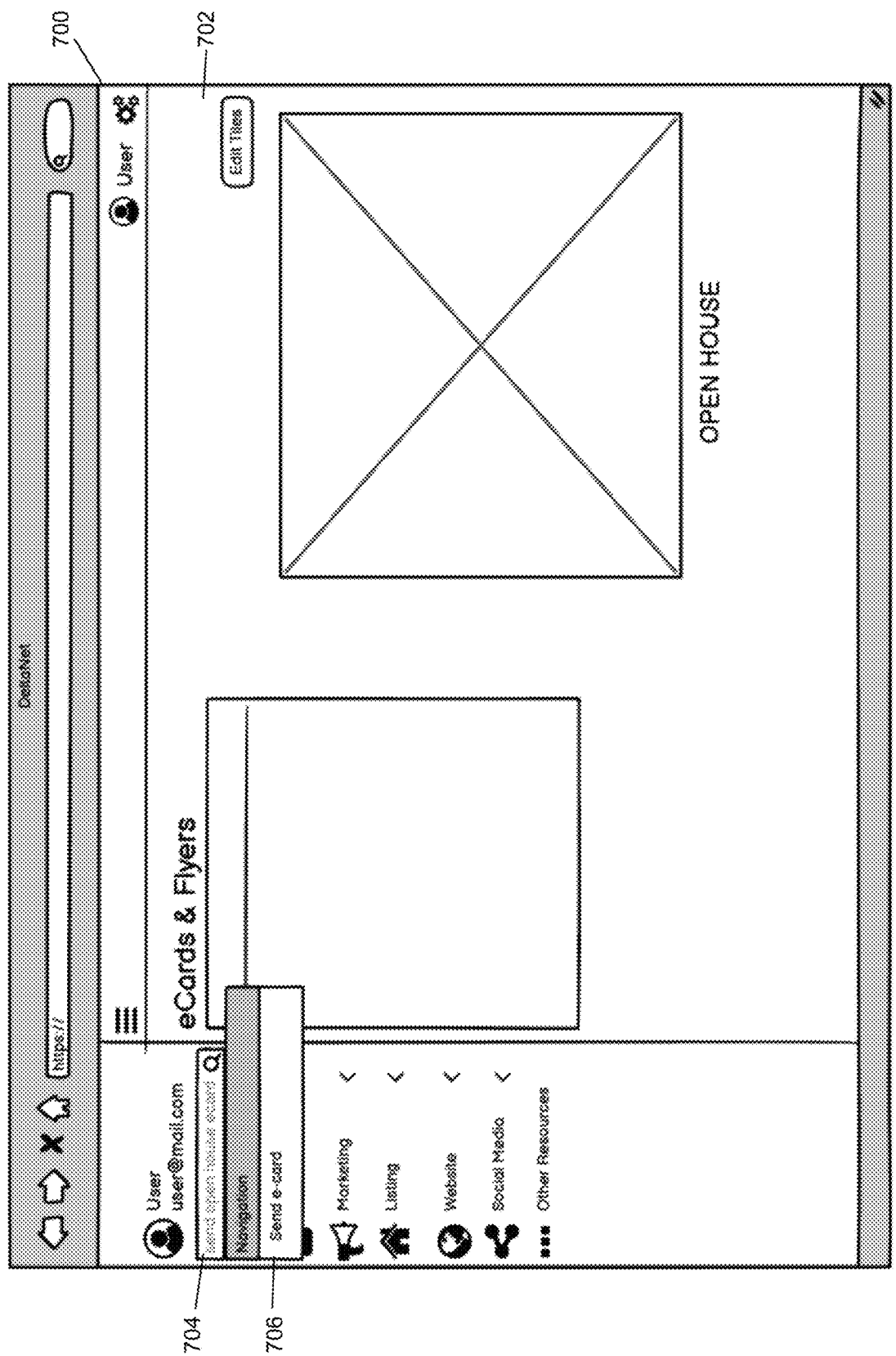
FIG. 5A illustrates an exemplary method of utilizing quick actions to improve the usability of a GUI in accordance with the principles disclosed herein.
Figure 5B:
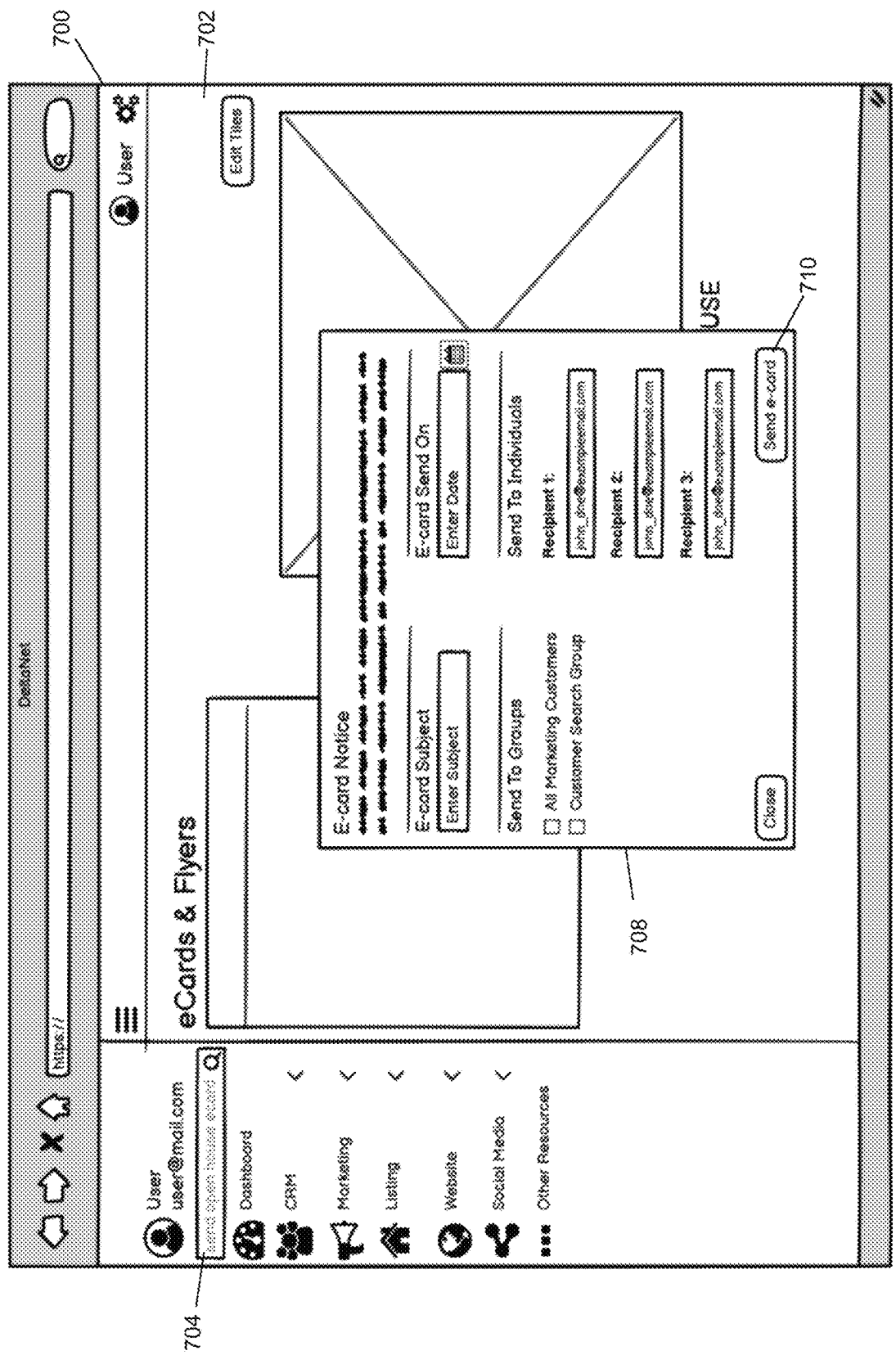
FIG. 5B illustrates an exemplary method of utilizing quick actions to improve the usability of a GUI in accordance with the principles disclosed herein.
Figure 5C:
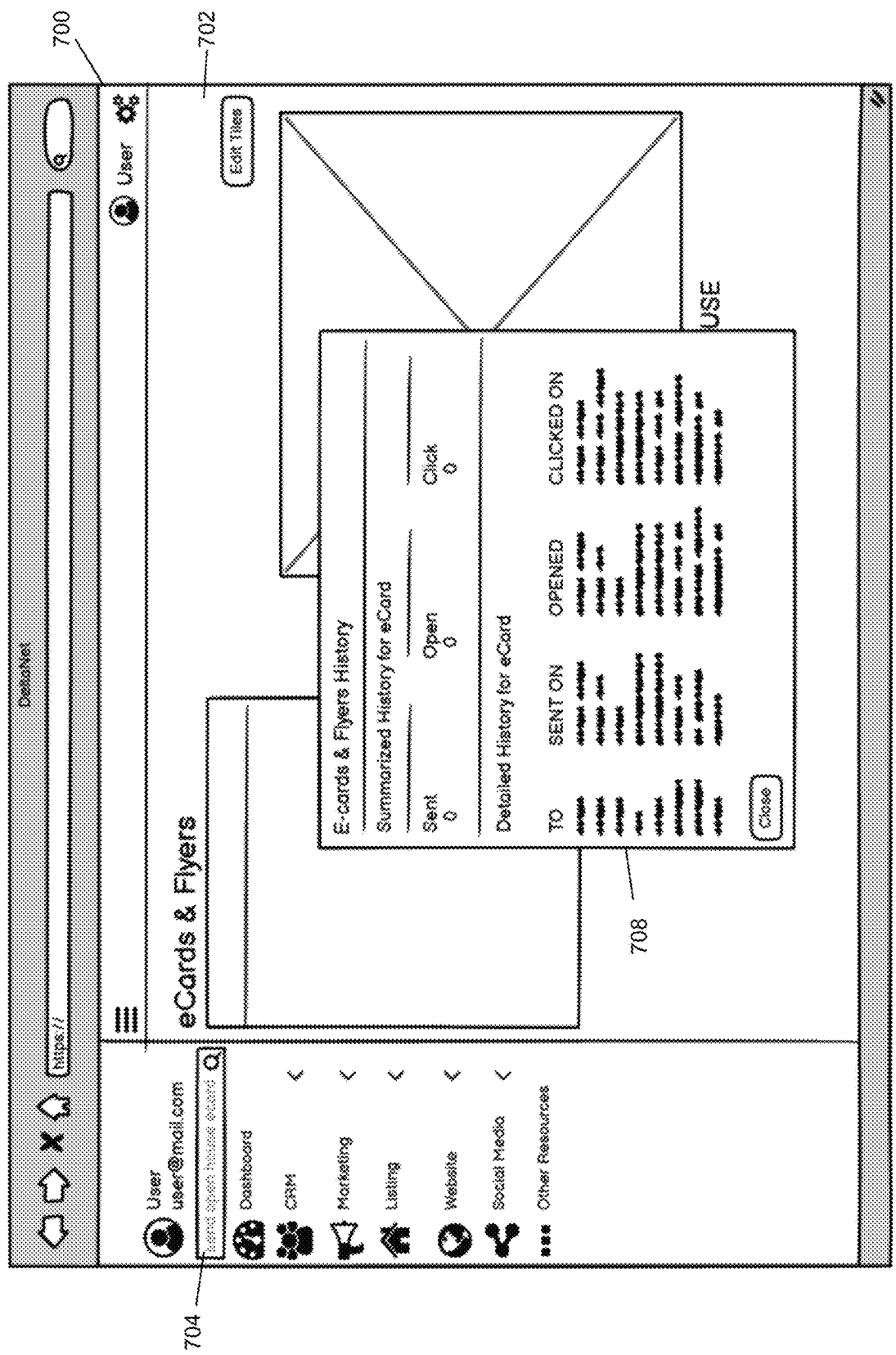
FIG. 5C illustrates an exemplary method of utilizing quick actions to improve the usability of a GUI in accordance with the principles disclosed herein.

Referring now to FIGS. 5A-5C, shown is an exemplary method of utilizing quick actions to improve the usability of a GUI in accordance with the principles disclosed herein. In FIG. 5A, screen 700, is an exemplary GUI of a CRM application. Primary application window 702 displays the current application of the CRM application. In this example the current application is for creating an Open House E-Card to promote an open house for a property listing. Primary application window 702 comprises search bar 704. For this example, the input for search bar 704 is "send open house ecard," or any other additional phrase related to sending a e-card. As discussed above with reference to FIG. 3, the search engine of the CRM application is configured to receive the input from search bar 704 and display a list of URL links corresponding to relevant quick actions and/or standard URL links. In this example, URL link 706 corresponds to a quick action to the e-mail marketing section of the CRM application.

The conventional method (without utilizing quick actions) requires a user to take various steps to send an e-card. First the user would need to utilize the routing engine of the CRM application to navigate to the application to create an e-card. In this example, this can be accomplished by either navigating to the marketing dashboard and selecting create e-card or utilizing search bar 704. Thereafter the user would need to navigate to the application to send an e-card. Each step transmits a HTTP GET request to a server and downloads HTML, images, CSS, and JavaScript code onto the local memory of the user terminal. As a result, the user terminal is required to cache or re-download portions of the web application as the user inefficiently navigates from application to application to send an e-card. This can adversely affect the performance of the web application on user terminals due to limited system resources. The use of quick actions in accordance with the principles disclosed herein drastically reduces the time needed, the steps required, and therefore, the training needed for a user to effectively learn to send an e-card.

Turning to FIG. 5B, after the user has selected the quick action link, the event handler of the CRM application processes the corresponding quick action for e-mailing the open house e-card. The quick action utilizes a call back function to suspend the internal state of the current application executing on primary application window 702 and executing another application displayed on secondary application window 708. As shown, secondary application window 708 comprises various GUI elements to allow a user to configure the subject line, recipients, and date and time to send an e-card. Submit button 710 is configured to process sending the e-card when the user clicks submit button 710, in accordance with the principles disclosed herein. As shown in FIG. 5B, the user quickly can quickly preview portions of the e-card (which is currently suspended in primary application window 702) while they configure the recipients of the e-card.

In some examples, the secondary application window can be configured to move within primary application window, thereby allow the user to preview different portions of the e-card. Several advantages, include allowing a user to preview the e-card for any errors without being directed to a different application of the CRM application. Further, the user can quickly determine which e-card they were currently working on, in the event that they step away from the CRM application and return at a later time.

In FIG. 5C, secondary application window 708 displays a summary indicating a summary of the recipients of the e-card and options to share the e-card on various social media platforms. Further, the user can exit secondary application window 708 and automatically return to primary application window 702.

Figure 6A:
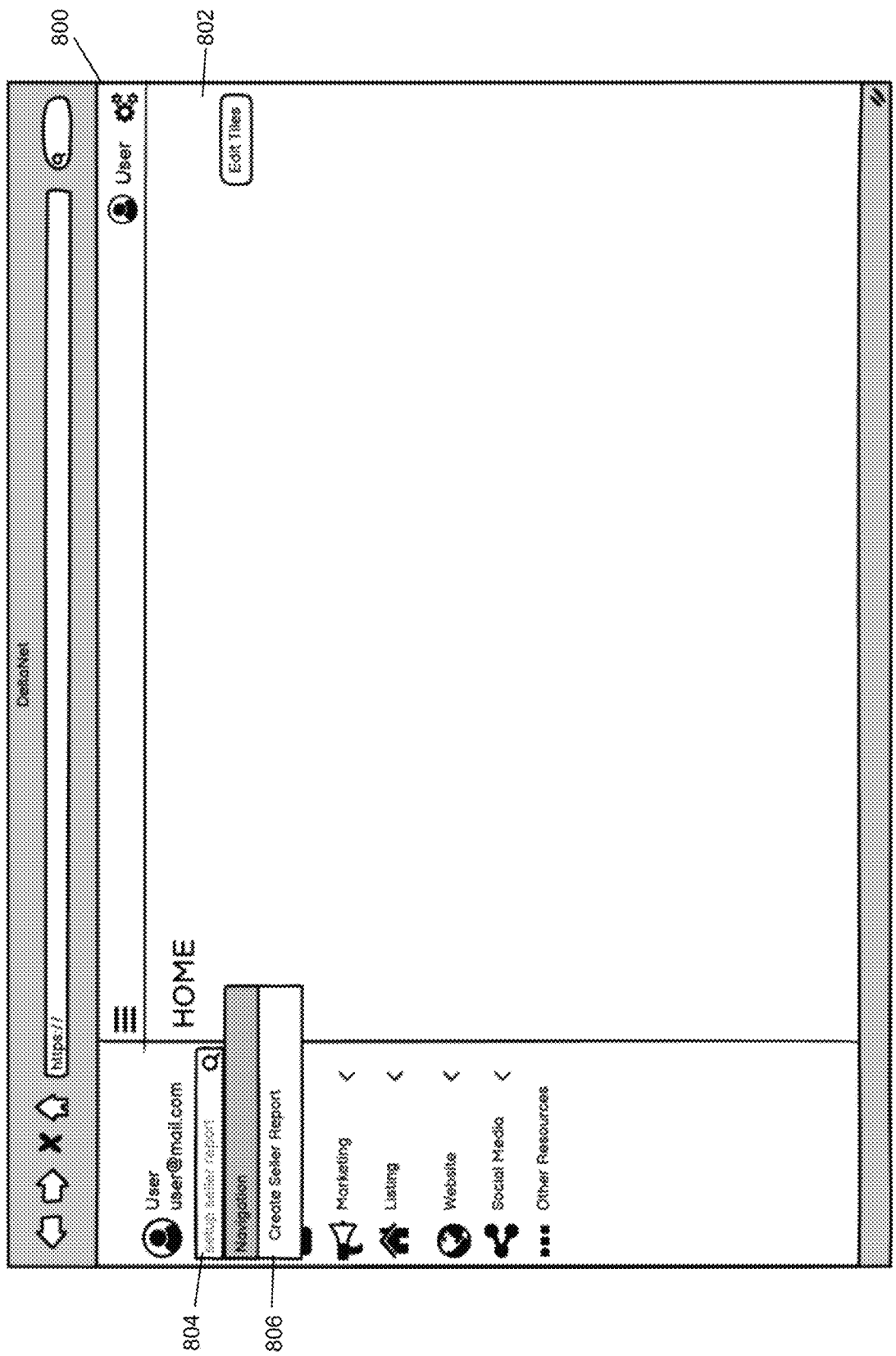
FIG. 6A illustrates an exemplary method of utilizing quick actions to improve the usability of a GUI in accordance with the principles disclosed herein.
Figure 6B:
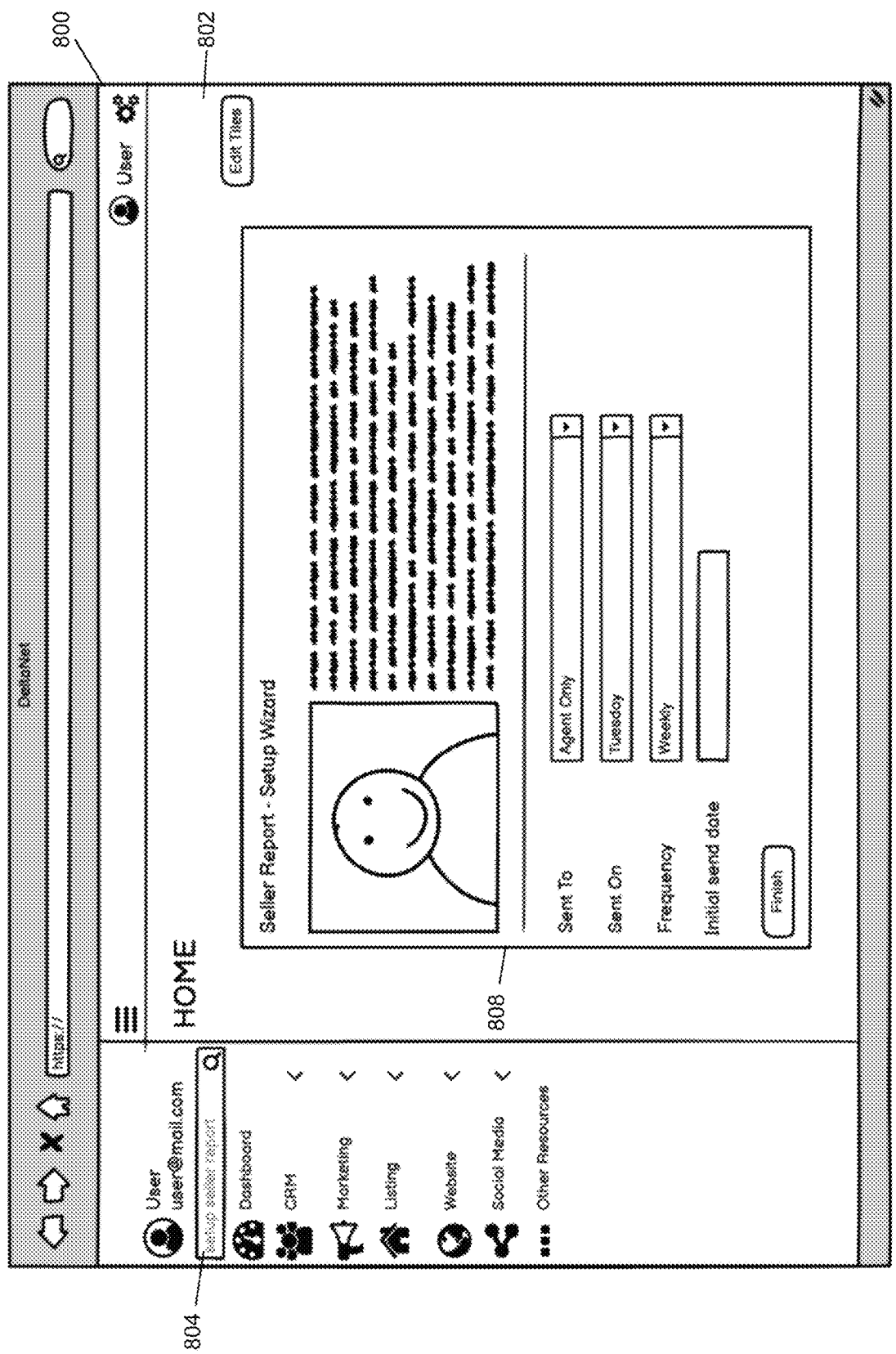
FIG. 6B illustrates an exemplary method of utilizing quick actions to improve the usability of a GUI in accordance with the principles disclosed herein.

Shown in FIGS. 6A-6B, is an exemplary method of utilizing quick actions to improve the usability of a GUI in accordance with the principles disclosed herein. Screen 800 comprises primary application window 802. Primary application window 802 is configured to display the current application of the CRM application that the user is interacting with. In this example, primary application window 802 depicts an exemplary home page of a CRM web application. Primary application window 802 comprises search bar 804. For this example, the input for search bar 804 is "setup seller report." Based on the input, shown is URL link 806. URL link 806 corresponds to a quick action to the e-mail reporting application of the CRM application.

The conventional method (without utilizing quick actions) requires a user to take various steps to navigate to the email marketing engine of the CRM application and set-up a new Property Seller Report. First the user would need to utilize the routing engine to navigate to the application with the e-mail reporting engine and take multiple steps to create a Property Seller Report. Each step taken by the user to navigate utilizing the routing engine transmits a HTTP GET request to a server and downloads HTML, images, CSS, and JavaScript code onto the local memory of the user terminal. As a result, the user terminal is required to cache or re-download portions of the web application as the user inefficiently navigates from application to application to setup a Property Seller Report. This can adversely affect the performance of the web application on user terminals due to limited system resources. The use of quick actions in accordance with the principles disclosed herein drastically reduces the time needed, the steps required, and therefore the training necessary for a user to effectively learn to send and setup a Property Seller Report.

After the user has selected the quick action link, the event handler of the CRM application processes the corresponding quick action for creating a seller report. The quick action utilizes a callback function to suspend the internal state of the current application executing on primary application window 802 and executing another application displayed on secondary application window 808. As shown, secondary application window 808 comprises various GUI elements to allow a user to configure a seller report. Submit button 810 is configured to process the seller report, and return the user to continue interacting with the application executing in primary application window 802.

Figure 7A:
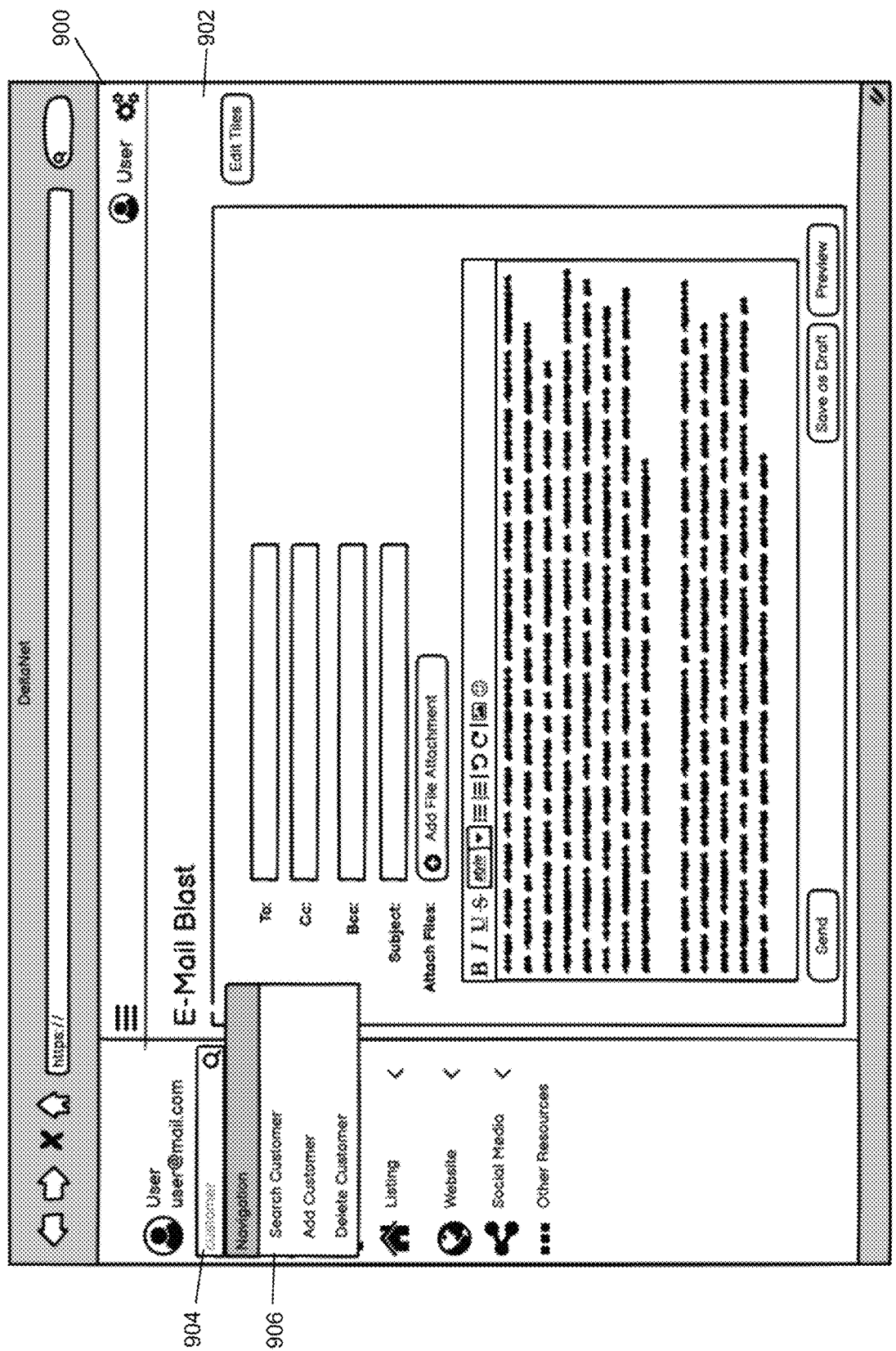
FIG. 7A illustrates an exemplary method of utilizing quick actions to improve the usability of a GUI in accordance with the principles disclosed herein.
Figure 7B:
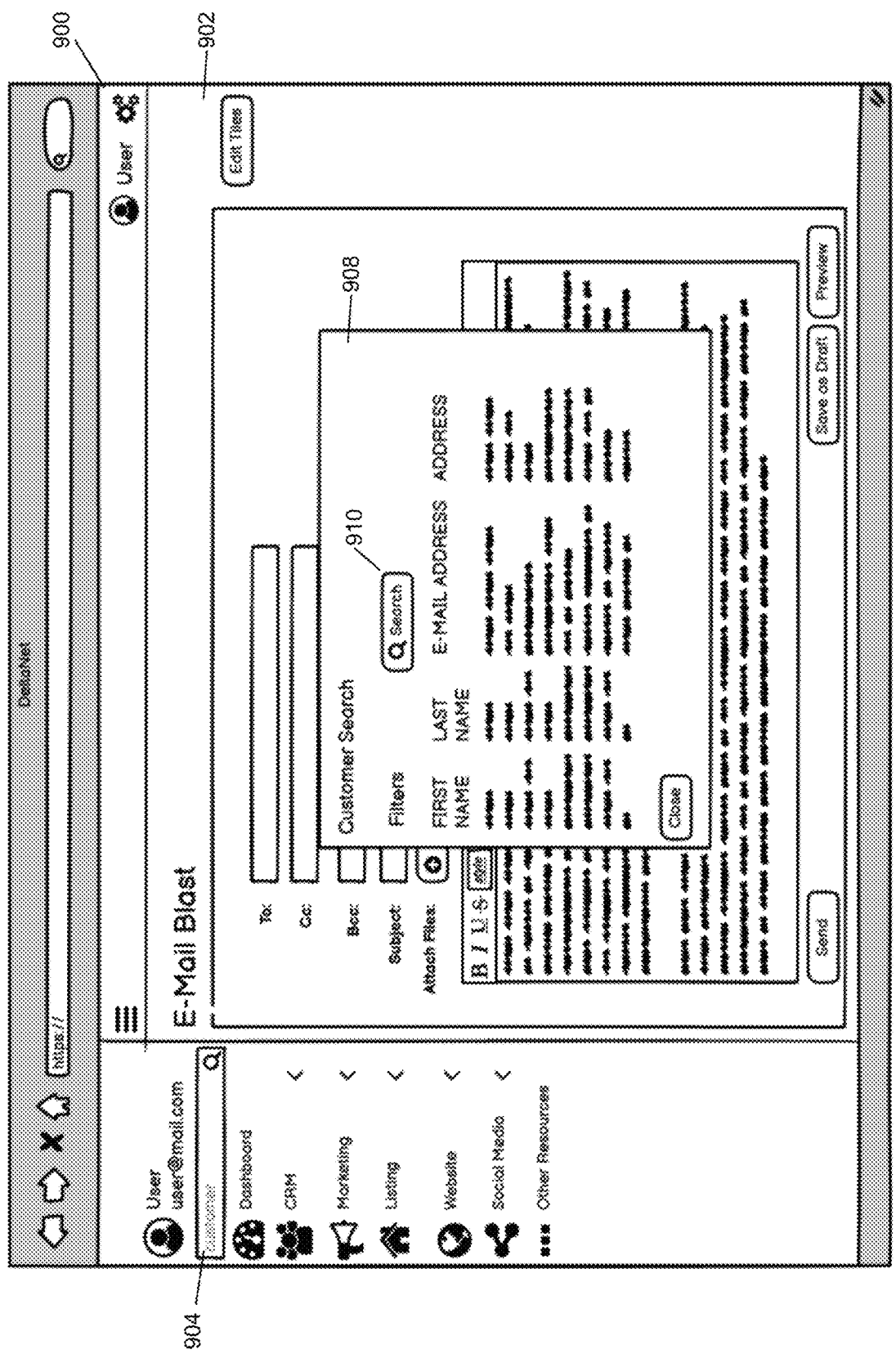
FIG. 7B illustrates an exemplary method of utilizing quick actions to improve the usability of a GUI in accordance with the principles disclosed herein.

FIGS. 7A-7B depict another exemplary method of utilizing quick actions to improve the usability of a GUI in accordance with the principles disclosed herein. In FIG. 7A, screen 900, is an exemplary GUI of a CRM application. Primary application window 902 displays the current application of the CRM application for drafting a client e-mail. In this example, the drafting e-mail functionality is part of the e-mail marketing engine of the CRM application. Primary application window 902 comprises search bar 904. As shown, the input for search bar 904 is "customer." As discussed above with reference to FIG. 3, the search engine of the CRM application is configured to receive the input from search bar 904 and display a list of URL links corresponding to relevant quick actions and/or standard URL links. In this example, URL link 906 corresponds to a quick action to execute the customer information application of the CRM application.

The conventional method (without utilizing quick actions) requires the user to either save a draft of the e-mail and leave the e-mail application to execute the client information lookup application of the CRM application. In the event that the user is not using an application, they would be required to open an additional web browser window, navigate to the appropriate section of the CRM application, lookup the client information, and then go back to the other web browser window. As discussed below, quick actions drastically improve the user workflow and thereby diminishes the need for user training.

Turning to FIG. 7B, after the user has selected the quick action link, the event handler of the CRM application processes the corresponding quick action to lookup client information. The quick action utilizes a callback function to suspend the internal state of the current application executing on primary application window 902 and display secondary application window 908. As shown, secondary application window 908 comprises various GUI elements to allow a user to search for client information. Submit button 910 is configured to search the CRM database for the requested customer information when the user selects submit button 910, in accordance with the principles disclosed herein. Once the user has found the needed client information, they can close secondary application window 908 and continue working on drafting the client e-mail on primary application window 902.

While the examples discussed above relate to the use of quick actions for an exemplary CRM application, it would be apparent to one of ordinary skill in the art to utilize quick actions to improve the usability of user interfaces in various other fields, without departing from the principles disclosed here. In fact the principles disclosed herein can be utilized for any implementation of a user interface on smart phones, automobiles with interactive screen displays, machine operators with interactive screen displays, and other computing devices.

For example, when using a car infotainment system, the driver can be required to access features of the car by opening an application and responding to prompts, all while performing various tasks related to driving. Exemplary systems include, but are not limited to, the BMW iDrive Interface. Conventional car infotainment systems can require the user to navigate various windows to access some of these features, which can distract the user's attention from driving.

Figure 8:
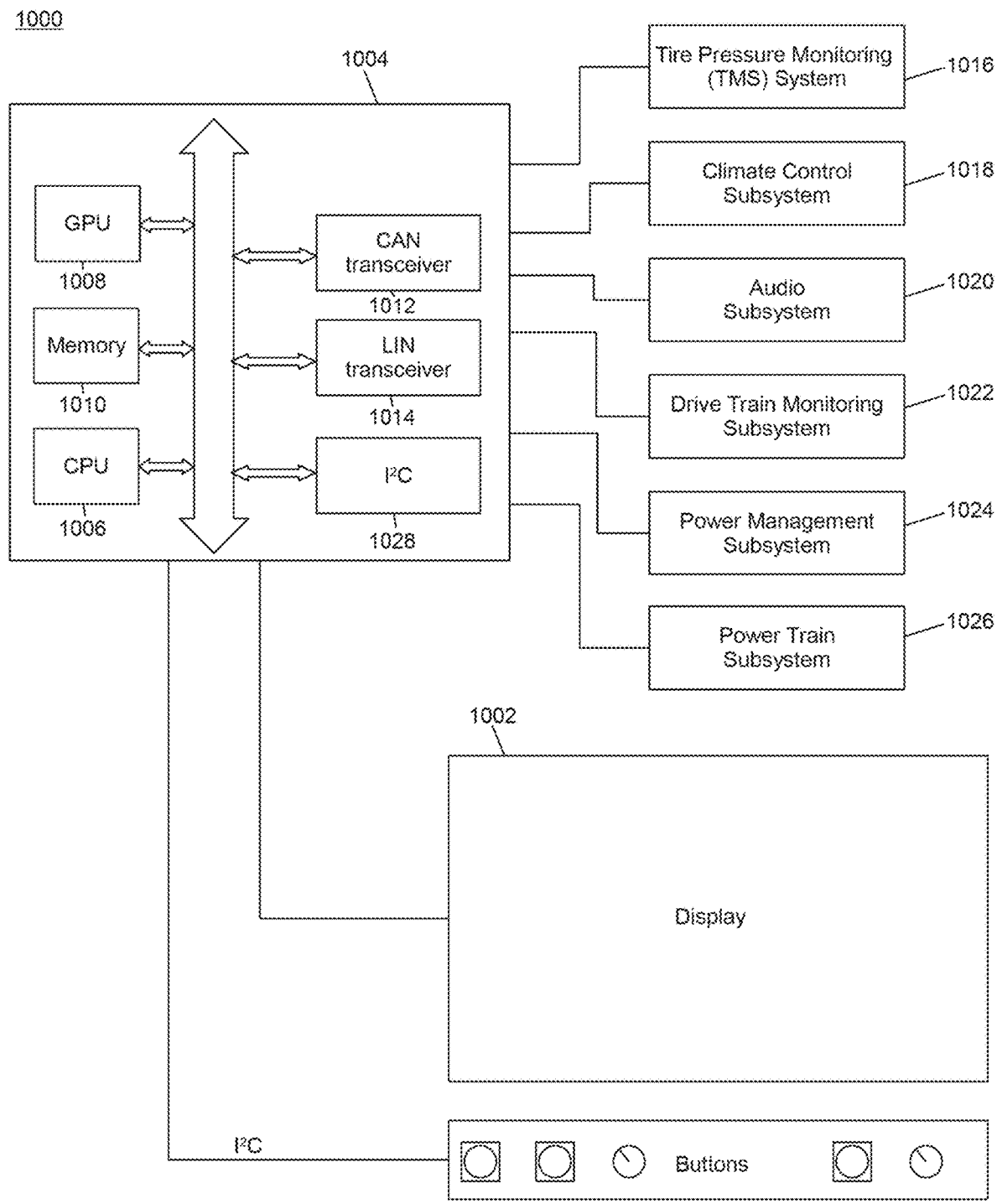
FIG. 8 illustrates an block diagram of a car interface system in accordance with the principles disclosed herein.

Turning to FIG. 8, shown is an exemplary block diagram of a car interface system in accordance with the principles disclosed herein. Car interface system 1000 comprises display 1002 coupled to vehicle interface controller 1004. Display 1002 comprises a touch-screen. Vehicle interface controller 1004 comprises central processor unit (CPU) 1006, graphics processor unit (GPU) 1008, and memory 1010. In this example, vehicle interface controller 1004 is coupled to the various controls and subsystems of the vehicle via CAN (Controller Area Network) transceiver 1012 and LIN (Local Interconnect Network) transceiver 1014. Exemplary subsystems include Tire Pressure Monitoring (TPM) Subsystem 1016, climate control subsystem 1018, audio subsystem 1020, drive train monitoring subsystem 1022, power management subsystem 1024, and power train subsystem 1026. The subsystems of the vehicle are configured to be accessed and/or viewed on display 1002 by a car interface application executing on vehicle interface controller 1004 in accordance with the principles disclosed herein. The car interface application comprises an application view, event handler, internal state, and search engine. The search engine is configured to receive an input from vehicle interface 1004. For example, vehicle interface 1004 is configured to communicate with buttons, knobs, and switches via I$^2$C (Inter-Integrated Circuit) bus 1028. Vehicle interface 1004 is also configured to receive inputs from icons displayed on display 1002. The car interface application comprises an event comparator configured to identify a corresponding matching event based on a comparison of input and predefined events.

Figure 9A:
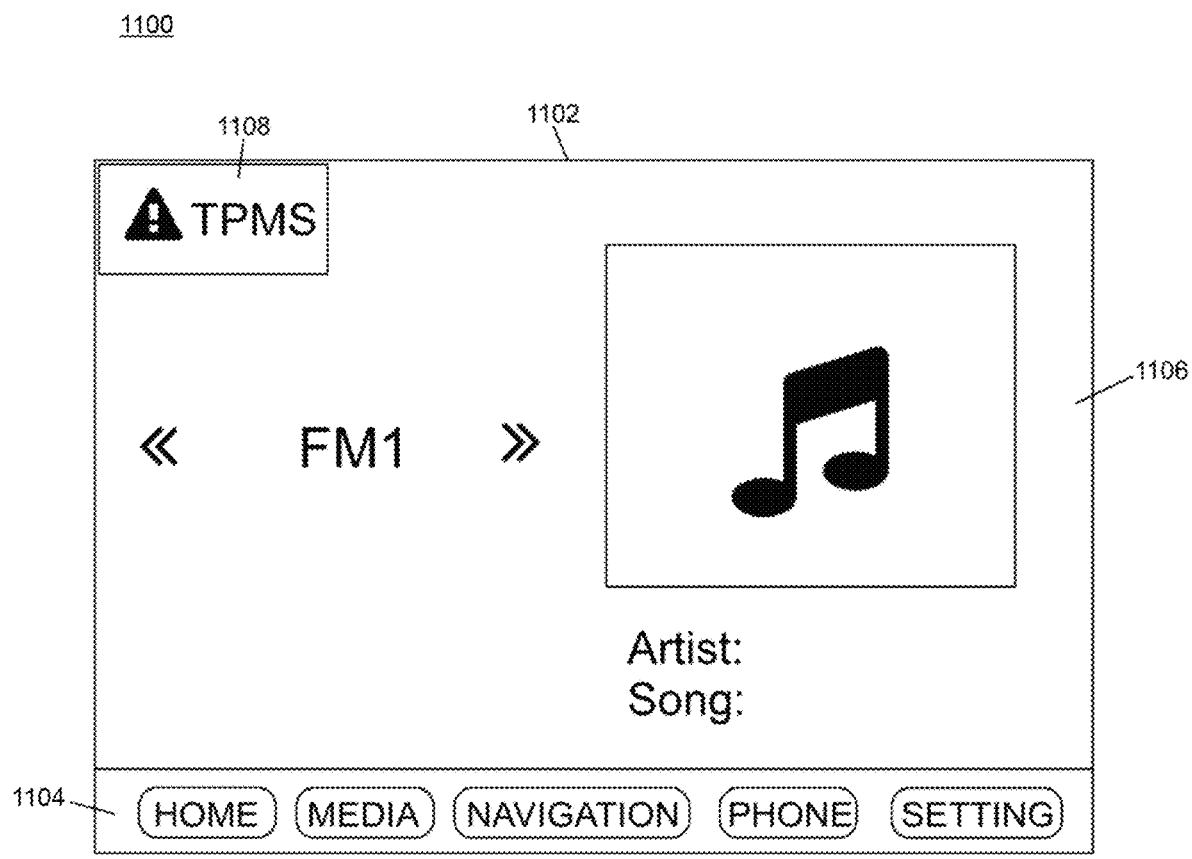
FIG. 9A illustrates an exemplary method of utilizing quick actions to improve the usability of a car interface system GUI in accordance with the principles disclosed herein.

FIG. 9A, shows an exemplary screen 1100 in accordance with the car interface system discussed in FIG. 8 above. Screen 1100 comprises display 1102 and controls 1104. Controls 1104 comprises buttons that are shortcuts for designated applications that are displayed on display 1102 when selected. Display 1102 comprises a touch screen which displays primary application window 1106. In accordance with the principles disclosed herein, a user is able to quickly and easily access the various applications of the car interface system. For example, while driving, a user may receive a notification 1106 that the tire pressure is low while primary application window 1106 is displaying the radio application. In this example, notification 1106 is configured as a quick link in accordance with the principles disclosed herein.

Conventional car interface systems would require the user to navigate to a setting menu and find the application associated with reviewing the Tire Pressure Monitor (TPM), all while performing various tasks related to driving. Once completed with reviewing the information, the user would need to navigate back to the radio application by click multiple buttons or select a shortcut (if available) to the radio application.

Figure 9B:
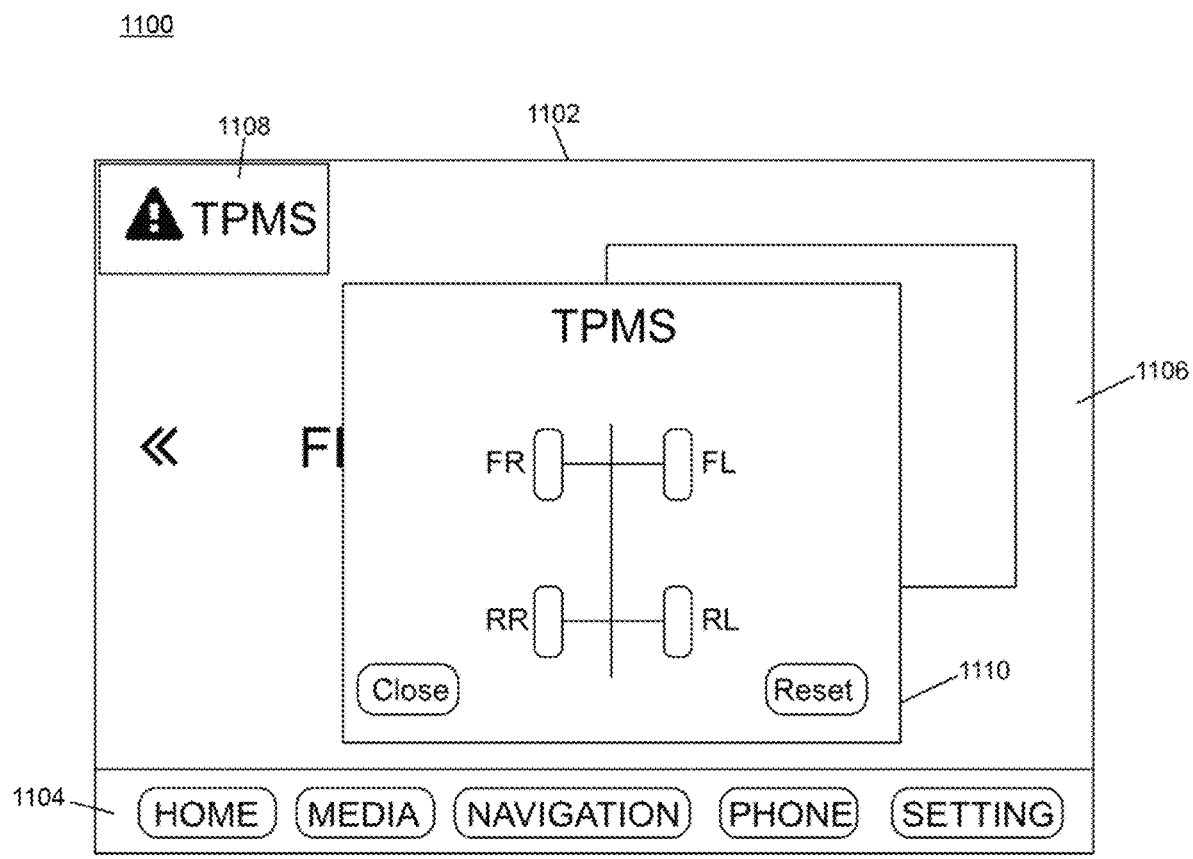
FIG. 9B illustrates an exemplary method of utilizing quick actions to improve the usability of a car interface system GUI in accordance with the principles disclosed herein.

Turning to FIG. 9B, after the user has selected the quick action link for the TPM notification, the event handler of the car interface application processes the corresponding quick action to review the TPM subsystem. The quick action utilizes a callback function to display secondary application window 1110 in front of primary application window 1106. Further, the user is suspended from interacting with primary application window. Once the user has completed reviewing the notification and/or resetting the TPM subsystem, secondary application window 1108 can be closed. Thereafter, the user can fully interact with the radio application on primary application window 1106.

Clause 1—A non-transitory computer-readable storage device storing computer executable instructions that when executed by a computer controls the computer to perform a method for executing a second software application within a first software application, the method including the steps of executing a first software application comprising code fragments for implementing quick actions, for utilizing call back functions, executed on the computer, displaying a plurality of first graphical user interface (GUI) elements on a primary application window, receiving an input from the primary application window, suspending the first software application and the primary application window in response to an event from the primary application window, displaying a secondary application window in response to the first software application executing a second software application comprising code fragments storing a reference to the first software application currently suspended, and closing the secondary application window and resuming the first software application and the primary application window. A quick action is an action in the first application that allows to enable a second application while suspending (holding) the first application.

Clause 2—The non-transitory computer readable storage device of clause 1, wherein suspending the first software application and the primary application window in response to an event from the primary application window includes preventing the primary application window from changing and preventing additional events from executing.

Clause 3—The non-transitory computer readable storage device of clauses 1 or 2, further comprising executable instructions to configure the computer to perform a method, the method including defining at least one callback function, configuring at least one first GUI element, and configuring a click event, wherein the click event of the at least one first GUI element invokes the at least one callback function.

Clause 4—The non-transitory computer readable storage device of one of the clauses 1-3, wherein displaying a secondary application window in response to the first software application executing a second software application comprises, displaying a plurality of second graphical user interface (GUI) elements on the second application window.

Clause 5—The non-transitory computer readable storage device of one of the clauses 1-4, further comprising executable instructions to configure the computer to perform a method, the method including receiving a user input, comparing the user input to a plurality of events, and selecting an event associated with the user input.

Clause 6—The non-transitory computer readable storage device of one of the clauses 1-5, wherein displaying a plurality of first GUI elements on primary application window comprises displaying a modal window.

Clause 7—The non-transitory computer readable storage device of one of the clauses 1-6, further comprising executable instructions to configure the computer to perform a method, the method including configuring at least one second GUI element with a click event configured to invoke a second callback function.

Clause 8—The non-transitory computer readable storage device of one of the clauses 1-7, wherein executing a first software application comprises, executing a reporting application of a customer relationship management (CRM) application.

Clause 9—The non-transitory computer readable storage device of one of the clauses 1-8, further comprising executable instructions to configure the computer to perform a method, the method including configuring the secondary application window to move within the primary application window.

Clause 10—The non-transitory computer readable storage device of one of the clauses 1-9, further comprising executable instructions to configure the computer to perform a method, the method including suspending the second software application and the secondary application window in response to the click event configured to invoke a second callback function, executing a third software application, and resuming the second software application after completion of the third software application.

Clause 11—The non-transitory computer readable storage device of one of the clauses 1-10, wherein suspending the second software application and the secondary application window in response to the click event configured to invoke a second callback function includes preventing the secondary application window from changing and preventing additional events from executing on the secondary application window.

Clause 12—The non-transitory computer readable storage device of one of the clauses 1 to 11, the method further comprising: displaying the plurality of first GUI elements corresponding to the first software application on the primary application window; receiving an event from the primary application window; suspending the first software application and the primary application window; invoking the first software application to execute a the second software application; displaying the plurality of second GUI elements corresponding to the second software application on the secondary application window; and resuming the first software application and the primary application window automatically after closing the second application window.

Clause 13—The non-transitory computer readable storage device of one of the preceding clauses 1 to 12, wherein the quick actions are defined in a global context in order to be called from any software application within the first software application.

Clause 14—The non-transitory computer readable storage device of one of the preceding clauses 1 to 13, the method further comprising the step of comparing the received input by a search engine of the first software application and returning a list of user selectable quick actions, as for instance shown in FIG. 3 above.

Clause 15—The non-transitory computer readable storage device of one of the preceding clauses 1 to 14, the method further comprising the step of receiving an input for selecting a quick action, optionally from the list of user selectable quick actions.

Clause 16—The non-transitory computer readable storage device of one of the preceding clauses 1 to 15, the method further comprising the step of triggering an event, by an event handler of the first software application, as for instance shown in FIG. 3 or FIG. 4A-B above.

Clause 17—The non-transitory computer readable storage device of one of the preceding clauses 1 to 16, the method further comprising the step of suspending the internal state of the first software application, as for instance shown in FIGS. 4A-B above.

Clause 18—A method performed by a computing device configured to display a graphical user interface (GUI) on a screen, the method including executing a first software application, comprising code fragments for implementing quick actions, for utilizing call back functions, executed on the computer, displaying a plurality of first GUI elements corresponding to the first software application on a primary application window, receiving an event from the primary application window, suspending the first software application and the primary application window, invoking the first software application to execute a second software application, comprising code fragments storing a reference to the first software application currently suspended, displaying a plurality of second GUI elements corresponding to the second software application on a secondary application window, and resuming the first software application and the primary application window automatically after closing the second application window. A quick action is an action in the first application that allows to enable a second application while suspending (holding) the first application.

Clause 19—The method of clause 18, further including defining at least one callback function, configuring at least one first GUI element, and configuring a click event, wherein the click event of the first GUI element invokes the at least one callback function.

Clause 20—The method of one of the clauses 18 and 19, wherein suspending the first software application and the primary application window includes preventing the primary application window from changing and preventing additional events from executing.

Clause 21—A method performed by a computing device configured to access a database storing customer relationship management (CRM) records containing CRM data, the method including executing a CRM software application, executing a first software application of the CRM software application, displaying a plurality of first GUI elements corresponding to the first software application on a primary application window, configuring at least one callback function, configuring at least one first GUI element, configuring a click event, wherein the click event of the first GUI element invokes the at least one callback function, receiving an event from the primary application window, suspending the first software application and the primary application window, invoking the first software application to execute a second software application, displaying a plurality of second GUI elements corresponding to the second software application on a secondary application window, and resuming the first software application and the primary application window automatically after closing the second application window.

Clause 22—The method of clause 21, wherein suspending the first software application and the primary application window includes preventing the primary application window from changing and preventing additional events from executing.

Clause 23—The method of one of the clauses 21 and 22, wherein displaying a plurality of second GUI elements corresponding to the second software application on a secondary application window comprises displaying a modal window.

Clause 24—The method of one of the clauses 21-23, further includes receiving a user input, comparing the user input to a plurality of events, and selecting an event associated with the user input.

Clause 25—The method of one of the clauses 21-24, further comprises defining the at least one callback function in a global context of the CRM application.

Clause 26—The method of clauses 21-25, further includes suspending the second software application and the secondary application window, executing a third software application, and resuming the second software application after completion of the third software application.

Clause 27—The method of one of the clauses 21 to 26, wherein the quick actions are defined in a global context in order to be called from any software application within the first software application.

Clause 28—The method of one of the clauses 21 to 27, the method further comprising the step of comparing the received input by a search engine of the first software application and returning a list of user selectable quick actions, as for instance shown in FIG. 3 above.

Clause 29—The method of one of the clauses 21 to 28, the method further comprising the step of receiving an input for selecting a quick action, from the list of user selectable quick actions.

Clause 30—The method of one of the clauses 21 to 29, the method further comprising the step of triggering an event, by an event handler of the first software application, as for instance shown in FIG. 3 or FIG. 4A-B above.

Clause 31—The method of one of the clauses 21 to 30, the method further comprising the step of suspending the internal state of the first software application, as for instance shown in FIGS. 4A-B above.

Clause 32—A customer relationship management (CRM) wherein a processor is configured for performing the steps of executing a first software application of a CRM software application, displaying a plurality of first GUI elements corresponding to the first software application on a primary application window, configuring at least one callback function, configuring at least one first GUI element, configuring a click event, wherein the click event of the first GUI element invokes the at least one callback function, receiving an event from the primary application window, suspending the first software application and the primary application window, invoking the first software application to execute a second software application, displaying a plurality of second GUI elements corresponding to the second software application on a secondary application window, and resuming the first software application and the primary application window automatically after closing the second application window.

Clause 33—The CRM of clause 32, wherein suspending the first software application and the primary application window includes preventing the primary application window from changing and preventing additional events from executing.

Clause 34—The CRM of one of the clauses 32 and 33, wherein displaying a plurality of second GUI elements corresponding to the second software application on a secondary application window comprises displaying a modal window.

Clause 35—The CRM of one of the clauses 32-34, further includes receiving a user input, comparing the user input to a plurality of events, and selecting an event associated with the user input.

Clause 36—The CRM of one of the clauses 32-35, further comprises defining the at least one callback function in a global context of the CRM application.

Clause 37—The CRM of clauses 32-36, further includes suspending the second software application and the secondary application window, executing a third software application, and resuming the second software application after completion of the third software application.

Clause 38—The CRM of one of the clauses 32 to 37, wherein the quick actions are defined in a global context in order to be called from any software application within the first software application.

Clause 39—The CRM of one of the clauses 32 to 38, the method further comprising the step of comparing the received input by a search engine of the first software application and returning a list of user selectable quick actions, as for instance shown in FIG. 3 above.

Clause 40—The CRM of one of the clauses 32 to 39, the method further comprising the step of receiving an input for selecting a quick action, from the list of user selectable quick actions.

Clause 41—A method for executing a second software application within a first software application, the method including the steps of executing a first software application comprising code fragments for implementing quick actions, for utilizing call back functions, executed on the computer, displaying a plurality of first graphical user interface (GUI) elements on a primary application window, receiving an input from the primary application window, suspending the first software application and the primary application window in response to an event from the primary application window, displaying a secondary application window in response to the first software application executing a second software application comprising code fragments storing a reference to the first software application currently suspended, and closing the secondary application window and resuming the first software application and the primary application window. A quick action is an action in the first application that allows to enable a second application while suspending (holding) the first application.

Clause 42—The method of clause 41, wherein suspending the first software application and the primary application window in response to an event from the primary application window includes preventing the primary application window from changing and preventing additional events from executing.

Clause 43—The method of clauses 41 or 42, further comprising executable instructions to configure the computer to perform a method, the method including defining at least one callback function, configuring at least one first GUI element, and configuring a click event, wherein the click event of the at least one first GUI element invokes the at least one callback function.

Clause 44—The method of one of the clauses 41-43, wherein displaying a secondary application window in response to the first software application executing a second software application comprises, displaying a plurality of second graphical user interface (GUI) elements on the second application window.

Clause 45—The method of one of the clauses 41-44, further comprising executable instructions to configure the computer to perform a method, the method including receiving a user input, comparing the user input to a plurality of events, and selecting an event associated with the user input.

Clause 46—The method of one of the clauses 41-45, wherein displaying a plurality of first GUI elements on primary application window comprises displaying a modal window.

Clause 47—The method of one of the clauses 41-46, further comprising executable instructions to configure the computer to perform a method, the method including configuring at least one second GUI element with a click event configured to invoke a second callback function.

Clause 48—The method of one of the clauses 41-47, wherein executing a first software application comprises, executing a reporting application of a customer relationship management (CRM) application.

Clause 49—The method of one of the clauses 41-48, further comprising executable instructions to configure the computer to perform a method, the method including configuring the secondary application window to move within the primary application window.

Clause 50—The method of one of the clauses 41-49, further comprising executable instructions to configure the computer to perform a method, the method including suspending the second software application and the secondary application window in response to the click event configured to invoke a second callback function, executing a third software application, and resuming the second software application after completion of the third software application.

Clause 51—The method of one of the clauses 41-50, wherein suspending the second software application and the secondary application window in response to the click event configured to invoke a second callback function includes preventing the secondary application window from changing and preventing additional events from executing on the secondary application window.

Clause 52—The method of one of the clauses 41 to 51, the method further comprising: displaying the plurality of first GUI elements corresponding to the first software application on the primary application window; receiving an event from the primary application window; suspending the first software application and the primary application window; invoking the first software application to execute a the second software application; displaying the plurality of second GUI elements corresponding to the second software application on the secondary application window; and resuming the first software application and the primary application window automatically after closing the second application window.

Clause 53—The method of one of the preceding clauses 41 to 52, wherein the quick actions are defined in a global context in order to be called from any software application within the first software application.

Clause 54—The method of one of the preceding clauses 41 to 53, the method further comprising the step of comparing the received input by a search engine of the first software application and returning a list of user selectable quick actions, as for instance shown in FIG. 3 above.

Clause 55—The method of one of the preceding clauses 41 to 54, the method further comprising the step of receiving an input for selecting a quick action, optionally from the list of user selectable quick actions.

Clause 56—The method of one of the preceding clauses 41 to 55, the method further comprising the step of triggering an event, by an event handler of the first software application, as for instance shown in FIG. 3 or FIG. 4A-B above.

Clause 57—The method of one of the preceding clauses 41 to 56, the method further comprising the step of suspending the internal state of the first software application, as for instance shown in FIGS. 4A-B above.

Clause 58—A computer device for executing a second software application within a first software application, the computer device configured to perform a method including the steps of executing a first software application comprising code fragments for implementing quick actions, for utilizing call back functions, executed on the computer, displaying a plurality of first graphical user interface (GUI) elements on a primary application window, receiving an input from the primary application window, suspending the first software application and the primary application window in response to an event from the primary application window, displaying a secondary application window in response to the first software application executing a second software application comprising code fragments storing a reference to the first software application currently suspended, and closing the secondary application window and resuming the first software application and the primary application window. A quick action is an action in the first application that allows to enable a second application while suspending (holding) the first application.

Clause 59—The computer device of clause 58, wherein suspending the first software application and the primary application window in response to an event from the primary application window includes preventing the primary application window from changing and preventing additional events from executing.

Clause 60—The computer device of clauses 58 or 59, further comprising executable instructions to configure the computer to perform a method, the method including defining at least one callback function, configuring at least one first GUI element, and configuring a click event, wherein the click event of the at least one first GUI element invokes the at least one callback function.

Clause 61—The computer device of one of the clauses 58-60, wherein displaying a secondary application window in response to the first software application executing a second software application comprises, displaying a plurality of second graphical user interface (GUI) elements on the second application window.

Clause 62—The computer device of one of the clauses 58-61, further comprising executable instructions to configure the computer to perform a method, the method including receiving a user input, comparing the user input to a plurality of events, and selecting an event associated with the user input.

Clause 63—The computer device of one of the clauses 58-62, wherein displaying a plurality of first GUI elements on primary application window comprises displaying a modal window.

Clause 64—The computer device of one of the clauses 58-63, further comprising executable instructions to configure the computer to perform a method, the method including configuring at least one second GUI element with a click event configured to invoke a second callback function.

Clause 65—The computer device of one of the clauses 58-64, wherein executing a first software application comprises, executing a reporting application of a customer relationship management (CRM) application.

Clause 66—The computer device of one of the clauses 58-65, further comprising executable instructions to configure the computer to perform a method, the method including configuring the secondary application window to move within the primary application window.

Clause 67—The computer device of one of the clauses 58-66, further comprising executable instructions to configure the computer to perform a method, the method including suspending the second software application and the secondary application window in response to the click event configured to invoke a second callback function, executing a third software application, and resuming the second software application after completion of the third software application.

Clause 68—The computer device of one of the clauses 58-67, wherein suspending the second software application and the secondary application window in response to the click event configured to invoke a second callback function includes preventing the secondary application window from changing and preventing additional events from executing on the secondary application window.

Clause 69—The computer device of one of the clauses 58 to 68, the method further comprising: displaying the plurality of first GUI elements corresponding to the first software application on the primary application window; receiving an event from the primary application window; suspending the first software application and the primary application window; invoking the first software application to execute a the second software application; displaying the plurality of second GUI elements corresponding to the second software application on the secondary application window; and resuming the first software application and the primary application window automatically after closing the second application window.

Clause 70—The computer device of one of the preceding clauses 58 to 69, wherein the quick actions are defined in a global context in order to be called from any software application within the first software application.

Clause 71—The computer device of one of the preceding clauses 58 to 70, the method further comprising the step of comparing the received input by a search engine of the first software application and returning a list of user selectable quick actions, as for instance shown in FIG. 3 above.

Clause 72—The computer device of one of the preceding clauses 58 to 71, the method further comprising the step of receiving an input for selecting a quick action, optionally from the list of user selectable quick actions.

Clause 73—The computer device of one of the preceding clauses 58 to 72, the method further comprising the step of triggering an event, by an event handler of the first software application, as for instance shown in FIG. 3 or FIG. 4A-B above.

Clause 74—The computer device of one of the preceding clauses 58 to 73, the method further comprising the step of suspending the internal state of the first software application, as for instance shown in FIGS. 4A-B above.

Clause 75—A non-transitory computer-readable storage device storing computer executable instructions that when executed by a computer controls the computer to perform a method to display a graphical user interface (GUI) on a screen, the method including executing a first software application, comprising code fragments for implementing quick actions, for utilizing call back functions, executed on the computer, displaying a plurality of first GUI elements corresponding to the first software application on a primary application window, receiving an event from the primary application window, suspending the first software application and the primary application window, invoking the first software application to execute a second software application, comprising code fragments storing a reference to the first software application currently suspended, displaying a plurality of second GUI elements corresponding to the second software application on a secondary application window, and resuming the first software application and the primary application window automatically after closing the second application window. A quick action is an action in the first application that allows to enable a second application while suspending (holding) the first application.

Clause 76—The non-transitory computer-readable storage device of clause 75, further including defining at least one callback function, configuring at least one first GUI element, and configuring a click event, wherein the click event of the first GUI element invokes the at least one callback function.

Clause 77—The non-transitory computer-readable storage device of one of the clauses 75 and 76, wherein suspending the first software application and the primary application window includes preventing the primary application window from changing and preventing additional events from executing.

Clause 78—A non-transitory computer-readable storage device storing computer executable instructions that when executed by a computer controls the computer to perform a method to access a database storing customer relationship management (CRM) records containing CRM data, the method including executing a CRM software application, executing a first software application of the CRM software application, displaying a plurality of first GUI elements corresponding to the first software application on a primary application window, configuring at least one callback function, configuring at least one first GUI element, configuring a click event, wherein the click event of the first GUI element invokes the at least one callback function, receiving an event from the primary application window, suspending the first software application and the primary application window, invoking the first software application to execute a second software application, displaying a plurality of second GUI elements corresponding to the second software application on a secondary application window, and resuming the first software application and the primary application window automatically after closing the second application window.

Clause 79—The non-transitory computer-readable storage device of clause 2781, wherein suspending the first software application and the primary application window includes preventing the primary application window from changing and preventing additional events from executing.

Clause 80—The non-transitory computer-readable storage device of one of the clauses 78 and 79, wherein displaying a plurality of second GUI elements corresponding to the second software application on a secondary application window comprises displaying a modal window.

Clause 81—The non-transitory computer-readable storage device of one of the clauses 78-80, further includes receiving a user input, comparing the user input to a plurality of events, and selecting an event associated with the user input.

Clause 82—The non-transitory computer-readable storage device of one of the clauses 78-81, further comprises defining the at least one callback function in a global context of the CRM application.

Clause 83—The non-transitory computer-readable storage device of clauses 78-82, further includes suspending the second software application and the secondary application window, executing a third software application, and resuming the second software application after completion of the third software application.

Clause 84—The non-transitory computer-readable storage device of one of the clauses 78 to 83, wherein the quick actions are defined in a global context in order to be called from any software application within the first software application.

Clause 85—The non-transitory computer-readable storage device of one of the clauses 78 to 84, the method further comprising the step of comparing the received input by a search engine of the first software application and returning a list of user selectable quick actions, as for instance shown in FIG. 3 above.

Clause 86—The non-transitory computer-readable storage device of one of the clauses 78 to 85, the method further comprising the step of receiving an input for selecting a quick action, from the list of user selectable quick actions.

Clause 87—The non-transitory computer-readable storage device of one of the clauses 78 to 86, the method further comprising the step of triggering an event, by an event handler of the first software application, as for instance shown in FIG. 3 or FIG. 4A-B above.

Clause 88—The non-transitory computer-readable storage device of one of the clauses 78 to 87, the method further comprising the step of suspending the internal state of the first software application, as for instance shown in FIGS. 4A-B above.

The various aspects have been described, hereinabove. It will be apparent to those skilled in the art that the above methods and apparatuses may incorporate changes and modifications without departing from the general scope of the present teachings. It is intended to include all such modifications and alterations insofar as they come within the scope of the appended claims or the equivalents thereof. Although the description above contains much specificity, this should not be construed as limiting the scope of the present teachings, but as merely providing illustrations of some of the aspects of the present teachings. Various other aspects and ramifications are possible within its scope.

Furthermore, notwithstanding that the numerical ranges and parameters setting forth the broad scope of the present teachings are approximations, the numerical values set forth in the specific examples are reported as precisely as possible. Any numerical value, however, inherently contain certain errors necessarily resulting from the standard deviation found in their respective testing measurements.

What is claimed is:

1. A non-transitory computer readable storage device storing computer executable instructions that when executed by a computer controls the computer to perform a method for executing a plurality of software applications, the method comprising:
   defining a plurality of global functions comprising at least one callback function, wherein the plurality of software applications are configured to execute the at least one callback function;
   executing an at least first software application of the plurality of software applications;
   displaying a plurality of first graphical user interface (GUI) elements on a primary application window;

configuring at least one first GUI element comprising a click event, wherein the click event of the at least one first GUI element invokes the at least one callback function;

utilizing the at least one callback function for suspending the at least first software application and the primary application window in response to executing the click event from the primary application window;

utilizing the at least one callback function for displaying a second application window positioned within the primary application window in response to the at least first software application of the plurality of software applications executing an at least second software application of the plurality of software applications, wherein the second application window is different than the primary application window;

utilizing an event handler to pass parameters to the second application window;

configuring the at least second application of the plurality of software applications to return data to the at least one callback function;

closing the secondary application window; and utilizing the at least one callback function for resuming the at least first software application of the plurality of software applications and the primary application window.

2. The non-transitory computer readable storage device of claim 1, wherein utilizing the at least one callback function for suspending the at least first software application of the plurality of software applications and the primary application window in response to executing the click event from the primary application window comprises:

preventing the at least first software application of the plurality of software applications from changing;

preventing additional events of the at least first software application of the plurality of software applications from executing; and utilizing the at least one callback function upon exit, the second application window passes results from the at least second software application to the primary application window.

3. The non-transitory computer readable storage device of claim 1, wherein utilizing the at least one callback function for displaying a secondary application window position within the primary application window in response to the at least first software application of the plurality of software applications executing an at least second software application of the plurality of software applications comprises:

displaying a plurality of second graphical user interface (GUI) elements on the secondary application window.

4. The non-transitory computer readable storage device of claim 1, further comprising executable instructions to configure the computer to perform a method, the method comprising:

receiving a user input;

comparing the user input to a plurality of events; and selecting an event associated with the user input.

5. The non-transitory computer readable storage device of claim 1, wherein utilizing the at least one callback function for displaying a secondary application window position within the primary application window in response to the at least first software application of the plurality of software applications executing an at least second software application of the plurality of software applications comprises:

displaying a modal window.

6. The non-transitory computer readable storage device of claim 1, further comprising executable instructions to configure the computer to perform a method, the method comprising:

configuring at least one second GUI element comprising a click event, wherein the click event of the of the at least second GUI element is configured to invoke a second callback function.

7. The non-transitory computer readable storage device of claim 6, further comprising executable instructions to configure the computer to perform a method, the method comprising:

utilizing the at least one callback function for suspending the at least second software application of the plurality of software applications and the secondary application window in response to the click event of the at lease second GUI element;

least second GUI element;

utilizing the at least one callback function for executing an at least third software application of the plurality of software applications; and utilizing the at least one callback function for resuming the at least second software application of the plurality of software applications after completion of the at least third software application of the plurality of software applications.

8. The non-transitory computer readable storage device of claim 7, wherein utilizing the at least one callback function for suspending the at least second software application of the plurality of software applications and the secondary application window in response to the click event of the at least second GUI element comprises:

preventing the secondary application window from changing; and preventing additional events from executing on the secondary application window.

9. The non-transitory computer readable storage device of claim 1, wherein executing an at least first software application of the plurality of software applications comprises, executing a reporting application of a customer relationship management (CRM) application.

10. The non-transitory computer readable storage device of claim 1, further comprising executable instructions to configure the computer to perform a method, the method comprising:

configuring the secondary application window to move within the primary application window.

11. A method performed by a computing device configured to access a database storing customer relationship management (CRM) records containing CRM data, the method comprising:

executing a CRM software application comprising a plurality of software applications;

executing an at least first software application of the plurality of software applications of the CRM software application;

displaying a plurality of first GUI elements corresponding to the at least first software application of the plurality of software applications on a primary application window;

configuring at least one callback function, wherein the plurality of software applications are configured to execute the at least one callback function;

configuring at least on first GUI element comprising a click event, wherein the click event of the at least one first GUI element invokes the at least one callback function;

utilizing the at least one callback function for suspending the at least first software application of the plurality of software applications and the primary application window;

utilizing the at least one callback function for invoking the at least first software application of the plurality of software applications to execute an at least second software application of the plurality of software applications;

utilizing the at least one callback function for displaying a plurality of second GUI elements corresponding to the at least second software application of the plurality of software applications on a secondary application window positioned within the primary application window, wherein the second application window is different than the primary application window;

utilizing an event handler to pass parameters to the second application window; and utilizing the at least one callback function for resuming the at least first software application of the plurality of software applications and the primary application window automatically after closing the secondary application window.

12. The method of claim 11, wherein utilizing the at least one callback function for suspending the at least first software application of the plurality of software applications and the primary application window comprises:

preventing the at least first software application of the plurality of software applications from changing;

preventing additional events of the at least first software application of the plurality of software applications from executing; and utilizing the at least one callback function upon exit, the second application window passes results from the at least second software application to the primary application window.

13. The method of claim 11, wherein utilizing the at least one callback function for displaying a plurality of second GUI elements corresponding to the at least second software application of the plurality of software applications on a secondary application window comprises displaying a modal window.

14. The method of claim 11, further comprises:
receiving a user input;
comparing the user input to a plurality of events; and
selecting an event associated with the user input.

15. The method of claim 11, further comprises defining a plurality of global function comprising the at least one callback function.

16. The method of claim 11, further comprises:
utilizing the at least one callback function for suspending the at least second software application of the plurality of software applications and the secondary application window;

utilizing the at least one callback function for executing an at least third software application of the plurality of software applications; and utilizing the at least one callback function for resuming the second software application after completion of the third software application.

17. A method performed by a computing device configured to display a graphical user interface (GUI) on a screen, the method comprising:

defining, by a processor of the computing device, a plurality of global functions comprising at least one callback function, wherein a plurality of software applications are configured to execute the at least one callback function;

executing, by the processor of the computing device, an at least first software application of the plurality of software applications;

displaying, by the processor of the computer device, a plurality of first GUI elements corresponding to the at least first software application of the plurality of software applications; on a primary application window;

receiving, by the processor of the computing device, an event from the primary application window;

utilizing the at least one callback function for suspending, by the processor of the computing device, the at least first software application and the primary application window;

utilizing the at least one callback function for invoking, by the processor of the computing device, the at least first software application to execute an at least second software application of the plurality of software applications;

utilizing the at least one callback function for displaying, by the processor of the computing device, a plurality of second GUI elements corresponding to the second software application on a secondary application window; and utilizing the at least one callback function for resuming, by the processor of the computing device, the first software application and the primary application window automatically after closing the second application.

18. The method of claim 17, wherein utilizing the at least one callback function for suspending, by the processor of the computing device, the at least first software application of the plurality of software applications and the primary application window comprises:

preventing, by the processor of the computing device, the at least first application software of the plurality of software applications from changing; and preventing, by the processor of the computing device, additional events of the at least first application software of the plurality of software applications from executing.

* * * * *